(12) United States Patent
Kato et al.

(10) Patent No.: US 8,281,289 B2
(45) Date of Patent: Oct. 2, 2012

(54) DEVICE, METHOD, AND PROGRAM FOR GENERATING AND EXECUTING EXECUTION BINARY IMAGE, AND COMPUTER-READABLE RECORDING MEDIUM CONTAINING THE EXECUTION BINARY IMAGE EXECUTION PROGRAM

(75) Inventors: Kazuomi Kato, Kyoto (JP); Teruto Hirota, Osaka (JP); Tetsuji Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1091 days.

(21) Appl. No.: 11/996,687

(22) PCT Filed: Jul. 25, 2006

(86) PCT No.: PCT/JP2006/314694

§ 371 (c)(1),
(2), (4) Date: Jan. 24, 2008

(87) PCT Pub. No.: WO2007/026484

PCT Pub. Date: Mar. 8, 2007

(65) Prior Publication Data

US 2010/0131932 A1    May 27, 2010

(30) Foreign Application Priority Data

Jul. 27, 2005  (JP) ................................. 2005-216715

(51) Int. Cl.
*G06F 9/45* (2006.01)
(52) U.S. Cl. ....................................... 717/141; 717/140
(58) Field of Classification Search .......... 717/101–178;
703/23; 712/35, 245; 709/201, 215; 706/20;
713/1–2, 100; 726/24; 382/173, 203, 298
See application file for complete search history.

(56) References Cited

U.S. PATENT DOCUMENTS 5,204,756 A * 4/1993 Chevion et al. ............... 382/239
(Continued)

FOREIGN PATENT DOCUMENTS

JP        4-160537        6/1992
(Continued)

OTHER PUBLICATIONS

International Search Report issued Aug. 22, 2006 in the International (PCT) Application No. PCT/JP2006/314694.

*Primary Examiner* — Lewis A Bullock, Jr.
*Assistant Examiner* — Francisco Aponte
(74) *Attorney, Agent, or Firm* — Wenderoth, Lind & Ponack, L.L.P.

(57) ABSTRACT

An execution binary image creating device includes an execution binary reading section (1) reading configuration information representing an internal configuration of an execution binary program to be executed on a computer and includes a deletable area detecting section (2) acquiring the configuration information of the execution binary program, analyzing information to be used in performing address resolution at a time of execution, and detecting a deletable area in the execution binary program, when the address resolution is not performed. Further, the device includes an execution binary rewriting section (3) rewriting the deletable area in the execution binary program into specific data and using an execution binary image creating section (4) reducing the data amount of the specific data included in the execution binary program, and converting the execution binary program into an execution binary image in a format recognizable on the computer.

18 Claims, 18 Drawing Sheets

U.S. PATENT DOCUMENTS

| | | | | |
|---|---|---|---|---|
| 5,740,446 | A * | 4/1998 | Fujiwara | 717/154 |
| 5,898,795 | A * | 4/1999 | Bessho | 382/173 |
| 6,014,513 | A * | 1/2000 | Voelker et al. | 717/131 |
| 6,110,227 | A * | 8/2000 | Marcelais et al. | 717/170 |
| 6,363,436 | B1 | 3/2002 | Hagy et al. | |
| 6,845,498 | B1 * | 1/2005 | Odinak et al. | 717/100 |
| 6,952,820 | B1 * | 10/2005 | Schultz et al. | 717/151 |
| 7,549,042 | B2 * | 6/2009 | Glaum et al. | 713/100 |
| 7,761,863 | B2 * | 7/2010 | Illowsky et al. | 717/167 |
| 2003/0182653 | A1 * | 9/2003 | Desoli et al. | 717/138 |
| 2004/0049654 | A1 * | 3/2004 | Chrysanthakopoulos et al. | 712/35 |
| 2005/0132179 | A1 * | 6/2005 | Glaum et al. | 713/1 |
| 2005/0268338 | A1 * | 12/2005 | van der Made | 726/24 |
| 2006/0112037 | A1 * | 5/2006 | Chagoly et al. | 706/20 |
| 2006/0129796 | A1 * | 6/2006 | Moore et al. | 713/2 |

FOREIGN PATENT DOCUMENTS

| | | |
|---|---|---|
| JP | 8-69381 | 3/1996 |
| JP | 10-228381 | 8/1998 |
| JP | 2002-225395 | 8/2002 |
| JP | 2002-529849 | 9/2002 |
| JP | 2003-174404 | 6/2003 |

* cited by examiner

FIG.3

| SECTION NAME | SECTION OUTLINE |
|---|---|
| .hash | HASH TABLE FOR RETRIEVING SYMBOL |
| .dynsym | SYMBOL INFORMATION TO BE USED IN DYNAMIC LINK |
| .dynstr | SYMBOL CHARACTER STRING TO BE USED IN DYNAMIC LINK |
| .gnu.version | VERSION TYPE INFORMATION ON SYMBOLS |
| .gnu.version_r | SYMBOL-RELATED INFORMATION INDICATING VERSION |
| .gnu.version_d | SYMBOL-RELATED INFORMATION INDICATING VERSION |
| .rel.data | RELOCATION INFORMATION RELATING TO .data |
| .rel.got | RELOCATION INFORMATION RELATING TO .got |
| .rel.bss | RELOCATION INFORMATION RELATING TO .bss |
| .rel.dyn | RELOCATION INFORMATION RELATING TO DYNAMIC INFORMATION |
| .rel.plt | RELOCATION INFORMATION RELATING TO .plt |
| .init | INITIATE CODE |
| .plt | INDIRECT REFERENCE TABLE FOR ACCESSING FUNCTION |
| .text | EXECUTION CODE OF PROGRAM |
| .fini | FINISH CODE |
| .rodata | DATA WITHOUT WRITING |
| .data | DATA WITH INITIALIZATION |
| .dynamic | POINTER TO VALUE OR SECTION NECESSARY FOR DYNAMIC LINK |
| .ctors | CONSTRUCTOR-RELATED INFORMATION |
| .dtors | DESTRUCTOR-RELATED INFORMATION |
| .got | INDIRECT REFERENCE TABLE FOR ACCESSING DATA |
| .sbss | DATA WITHOUT INITIALIZATION |
| .bss | DATA WITHOUT INITIALIZATION |
| .comment | COMMENT |

INTERNAL ADMINISTRATION STRUCTURE
OF SYMBOL INFORMATION

ORDINARY EXECUTION
BINARY IMAGE

EXECUTION BINARY IMAGE CREATED
BY UTILIZING SHARED PAGE

DEVICE, METHOD, AND PROGRAM FOR GENERATING AND EXECUTING EXECUTION BINARY IMAGE, AND COMPUTER-READABLE RECORDING MEDIUM CONTAINING THE EXECUTION BINARY IMAGE EXECUTION PROGRAM

TECHNICAL FIELD

The present invention relates to an information processing system, an information processing method, an execution binary image creating device, an execution binary image creating method, an execution binary image creating program, a computer-readable recording medium recorded with the execution binary image creating program, an execution binary image executing device, an execution binary image executing method, an execution binary image executing program, and a computer-readable recording medium recorded with the execution binary image executing program for creating various execution binary images to be executed on a computer.

BACKGROUND ART

In most of the cases, devices or computers loaded with a multi-task OS (operating system) such as Linux® or Windows® adopt a dynamic loading system. This is because the dynamic loading system is a system for determining an address of a main body of the program or a shared library to be used in executing an execution binary program for the first time, and it is necessary to perform relocation processing, in other words, perform address resolution of symbols to be used. In view of this, information on the execution binary program includes relocation information/symbol information. When the program is executed, a dynamic loader determines the address of a function or a variable by using the relocation information/symbol information. Accordingly, the relocation information/symbol information is essential information in executing the execution binary program of the dynamic loading system. Therefore, in the conventional art, the relocation information/symbol information is required to be included in the execution binary image, along with text information/data information, which is an execution code of the execution binary program.

As an example of the conventional art for reducing the data size of an ROM (read only memory) under the above circumstances, there is disclosed a technology. According to the technology, after a program is executed for the first time using a built-in loader, a structure necessary for address resolution of a shared library is stored in a storage other than the ROM. Then, the structure is deleted from the execution binary program, and address resolution is performed by relocating a pointer, with use of information necessary for address resolution stored in the storage in executing the program for the second time (see e.g. Japanese Unexamined Patent Publication No. Hei 10-228381).

In the conventional art, however, a storage capacity for storing the structural data is required, despite reduction of the data size of the execution binary program to be loaded in the ROM by storing the structure necessary for address resolution of the shared library in an external storage or the other storage. This arrangement necessitates use of an additional storage area.

Also, in operating the execution binary program on the dynamic loading system, it is not clear in what condition which part of the relocation information/symbol information in the execution binary program is to be actually deleted.

In addition to the above drawbacks, the location address of text information/data information, as a code main body of the execution binary program, may be changed resulting from a change of the internal configuration of the execution binary program, if the information on the execution binary program is partly edited or deleted. In such a case, it is necessary to detect a site corresponding to the address position pointed by the pointer so as to utilize the execution binary program before the change has occurred, within the entirety of the execution binary program, and correct the address of detected the site by the change. Without the correction, the execution binary program is not operated as a program. It is, however, extremely difficult for the execution binary program to detect the address position where the change has occurred. Thus, the conventional art has a drawback that it is impossible to delete relocation information/symbol information from the execution binary program by a simple operation.

DISCLOSURE OF THE INVENTION

In view of the above problems, an object of the invention is to provide an information processing system, an information processing method, an execution binary image creating device, an execution binary image creating method, an execution binary image creating program, a computer-readable recording medium recorded with the execution binary image creating program, an execution binary image executing device, an execution binary image executing method, an execution binary image executing program, and a computer-readable recording medium recorded with the execution binary image executing program that enable to reduce the data amount of an execution binary image.

An information processing system according to an aspect of the invention comprises: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; an execution binary image converting section for reducing a data amount of the specific data included in the execution binary program rewritten by the execution binary rewriting section, and converting the execution binary program into an execution binary image in a format recognizable on the computer; an execution binary image storing section for storing the execution binary image converted by the execution binary image converting section; and an executing section for developing the execution binary image stored in the execution binary image storing section in a virtual address space for execution.

An information processing method according to another aspect of the invention comprises: an execution binary reading step of reading configuration information representing an internal configuration of an execution binary program to be executed on a computer; a deletable area detecting step of acquiring the configuration information of the execution binary program read in the execution binary reading step, analyzing information to be used in performing address resolution at the time of execution, and detecting a deletable area in the execution binary program, if the address resolution is not performed; an execution binary rewriting step of rewriting the deletable area in the execution binary program detected in the deletable area detecting step into specific data; an execution binary image converting step of reducing a data amount of the specific data included in the execution binary program rewritten in the execution binary rewriting step, and converting the execution binary program into an execution binary image in a format recognizable on the computer; an execution binary image storing step of storing the execution binary image converted in the execution binary image converting step in an execution binary image storing section; and an executing step of developing the execution binary image stored in the execution binary image storing section in the execution binary image storing step, in a virtual address space for execution.

In the above arrangements, the configuration information representing the internal configuration of the execution binary program to be executed on the computer is read. Then, the read configuration information of the execution binary program is acquired, and analysis is made on the information to be used in performing the address resolution at the time of execution. If the address resolution is not performed, the deletable area in the execution binary program is detected. Subsequently, the detected deletable area in the execution binary program is rewritten into the specific data. Then, the data amount of the rewritten specific data included in the execution binary program is reduced, and the execution binary program is converted into the execution binary image in the format recognizable on the computer. The converted execution binary image is stored in the execution binary image storing section, and the execution binary image stored in the execution binary image storing section is developed in the virtual address space for execution.

An execution binary image creating device according to another aspect of the invention comprises: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; and an execution binary image converting section for reducing a data amount of the specific data included in the execution binary program rewritten by the execution binary rewriting section, and converting the execution binary program into an execution binary image in a format recognizable on the computer.

An execution binary image creating method according to another aspect of the invention comprises: an execution binary reading step of reading configuration information representing an internal configuration of an execution binary program to be executed on a computer; a deletable area detecting step of acquiring the configuration information of the execution binary program read in the execution binary reading step, analyzing information to be used in performing address resolution at the time of execution, and detecting a deletable area in the execution binary program, if the address resolution is not performed; an execution binary rewriting step of rewriting the deletable area in the execution binary program detected in the deletable area detecting step into specific data; and an execution binary image converting step of reducing a data amount of the specific data included in the execution binary program rewritten in the execution binary rewriting step, and converting the execution binary program into an execution binary image in a format recognizable on the computer.

An execution binary image creating program according another aspect of the invention causes a computer to function as: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; and an execution binary image converting section for reducing a data amount of the specific data included in the execution binary program rewritten by the execution binary rewriting section, and converting the execution binary program into an execution binary image in a format recognizable on the computer.

A computer-readable recording medium recorded with an execution binary image creating program according to another aspect of the invention causes a computer to function as: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; and an execution binary image converting section for reducing a data amount of the specific data included in the execution binary program rewritten by the execution binary rewriting section, and converting the execution binary program into an execution binary image in a format recognizable on the computer.

In the above arrangements, the configuration information representing the internal configuration of the execution binary program to be executed on the computer is read. Then, the read configuration information of the execution binary program is acquired, and analysis is made on the information to be used in performing the address resolution at the time of execution. If the address resolution is not performed, the deletable area in the execution binary program is detected. Subsequently, the detected deletable area in the execution binary program is rewritten into the specific data. Then, the data amount of the rewritten specific data included in the execution binary program is reduced, and the execution binary program is converted into the execution binary image in the format recognizable on the computer. The converted execution binary image is stored in the execution binary image storing section, and the execution binary image stored in the execution binary image storing section is developed in the virtual address space for execution.

An execution binary image executing device according to another aspect of the invention comprises: an execution binary image storing section for storing an execution binary image obtained by rewriting a deletable area in an execution binary program to be executed on a computer into specific data, reducing a data amount of the specific data included in the rewritten execution binary program, and performing conversion into a format recognizable on the computer; and an executing section for developing the execution binary image stored in the execution binary image storing section in a virtual address space for execution.

An execution binary image executing method according to another aspect of the invention comprises: an execution binary image storing step of storing an execution binary image in an execution binary image storing section, the execution binary image being obtained by rewriting a deletable area in an execution binary program to be executed on a computer into specific data, reducing a data amount of the specific data included in the rewritten execution binary program, and performing conversion into a format recognizable on the computer; and an executing step of developing the execution binary image stored in the execution binary image storing section in the execution binary image storing step, in a virtual address space for execution.

An execution binary image executing program according to yet another aspect of the invention causes a computer to function as: an execution binary image storing section for storing an execution binary image obtained by rewriting a deletable area in an execution binary program to be executed on a computer into specific data, reducing a data amount of the specific data included in the rewritten execution binary program, and performing conversion into a format recognizable on the computer; and an executing section for developing the execution binary image stored in the execution binary image storing section in a virtual address space for execution.

A computer-readable recording medium recorded with an execution binary image executing program according to still another aspect of the invention causes a computer to function as: an execution binary image storing section for storing an execution binary image obtained by rewriting a deletable area in an execution binary program to be executed on a computer into specific data, reducing a data amount of the specific data included in the rewritten execution binary program, and performing conversion into a format recognizable on the computer; and an executing section for developing the execution binary image stored in the execution binary image storing section in a virtual address space for execution.

In the above arrangements, the deletable area in the execution binary program to be executed on the computer is rewritten into the specific data. The data amount of the rewritten specific data included the execution binary program is reduced. The execution binary image converted in the format recognizable on the computer is stored in the execution binary image storing section. Then, the execution binary image stored in the execution binary image storing section is developed in the virtual address space for execution.

According to the invention, a deletable area such as relocation information or symbol information is detected from the execution binary program. The detected deletable area is rewritten into specific data, and the data amount of the specific data is reduced. This arrangement enables to reduce the data amount of the execution binary image, without changing the location address of the execution code main body, such as text information or data information included in the execution binary program.

These and other objects, features, aspects, and advantages of the present invention will become more apparent upon reading of the following detailed description along with the accompanying drawings.

BRIEF DESCRIPTION OF THE DRAWINGS

FIG. 3 is a diagram for describing a representative section in the execution binary program.

BEST MODE FOR CARRYING OUT THE INVENTION

Figure 1:
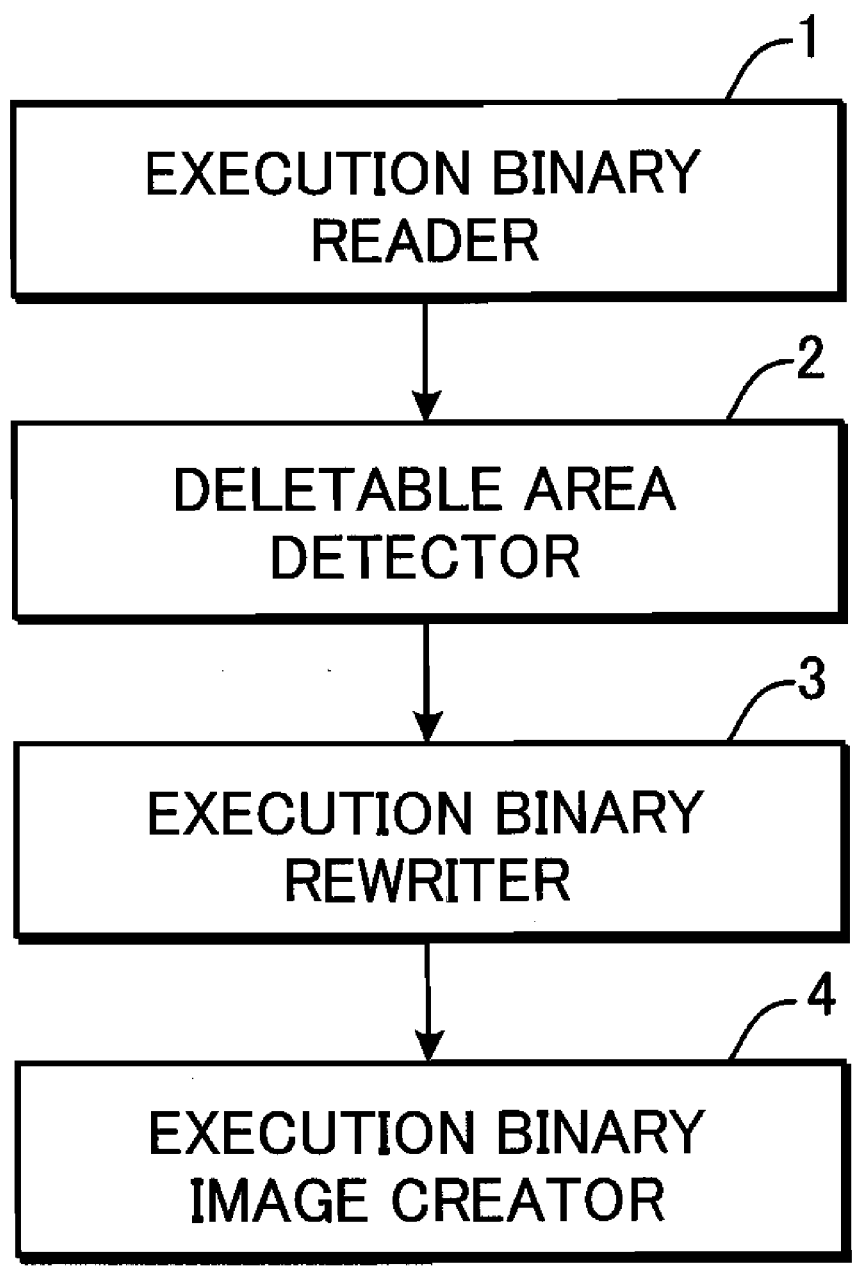
FIG. 1 is a block diagram showing a configuration of an execution binary image creating device embodying the invention.

In the following, an embodiment of the invention is described referring to the drawings.

FIG. 1 is a block diagram showing an arrangement of an execution binary image creating device embodying the invention. The execution binary image creating device in the embodiment includes an execution binary reader 1 for using an execution binary program to be executed on a computer as an input, and reading configuration information representing an internal configuration of the execution binary program; a deletable area detector 2 for acquiring the configuration information of the execution binary program read by the execution binary reader 1, analyzing information to be used in address resolution at the time of execution, and detecting a deletable area within the execution binary program; an execution binary rewriter 3 for rewriting the deletable area in the execution binary program detected by the deletable area detector 2 into specific data to reconfigure the execution binary program; and an execution binary image creator 4 for converting at least one execution binary program received from the execution binary rewriter 3 in a format recognizable and executable on the computer.

The execution binary program in the specification includes execution codes and execution data in a binary format. In the embodiment, the execution binary reader 1 corresponds to an example of an execution binary reading section, the deletable area detector 2 corresponds to an example of a deletable area detecting section, the execution binary rewriter 3 corresponds to an example of an execution binary writing section, and the execution binary image creator 4 corresponds to an example of an execution binary image converting section. Also, in the embodiment, the execution binary image creating program is stored in e.g. an ROM (read only memory), and the execution binary image creating program causes a CPU (central processing unit) to function as the execution binary reader 1, the deletable area detector 2, the execution binary rewriter 3, and the execution binary image creator 4.

Detailed configuration and operation of the execution binary image creating device having the above arrangement are described in the following. The execution binary reader 1 uses the execution binary program operable on a computer, in other words, a file in an execution format, as an input. First, the format of the execution binary program is described in the following.

Currently, various execution formats are available. For instance, ELF (Executable and Linking Format) format, a.out format, COFF (Common Object File Format) format, ECOFF (Extended COFF) format, and PE (Portable Executable) format are some representative examples of the execution format. To simplify the description of the embodiment, description is made by taking an example of an execution binary program in an ELF format, as a representative example of the execution format. The execution binary program is run on Unix® or Linux®. The embodiment is not limited to use of the execution binary program in the ELF format, but may be implemented by an execution binary program in any other execution format.

Figure 2:
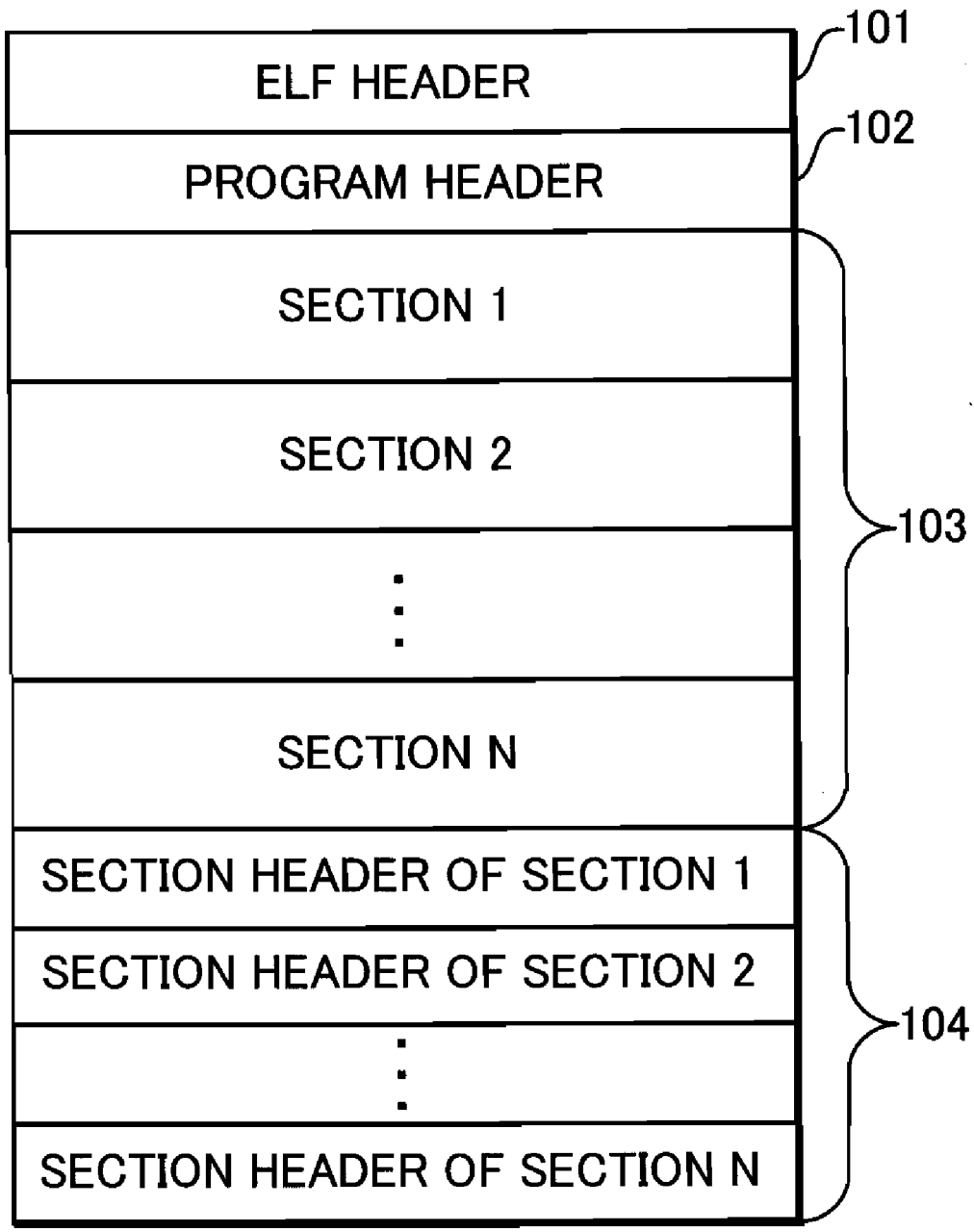
FIG. 2 is a diagram showing an example of an internal configuration of an execution binary program.

The internal configuration of the execution binary program is described referring to FIG. 2 by taking an example of a configuration of ELF format. FIG. 2 is a diagram showing an example of the internal configuration of the execution binary program. An ELF header 101 for administering the information on the entirety of the execution binary program is located at a lead end of the execution binary program. The ELF header 101 stores therein information for discriminating an application program from a shared library, offset information to be supplied to a program header 102 or a section header 104, which follows the ELF header 101, and other information relating to the entirety of the execution binary program.

The program header 102 following the ELF header 101 stores therein information for administering areas called segments. One or more sections belong to each of the segments. Multiple sections 103 serving as live data of the execution binary program i.e. the section 1 to the section N are defined in accordance with roles of the sections. Section headers 104 are defined by the number corresponding to the sections 1 through N to administer the corresponding sections.

Representative sections serving as live data of the execution binary program are described in the following. FIG. 3 is a diagram for describing the representative sections serving as live data of the execution binary program. Referring to FIG. 3, the column under the section name 111 indicates the titles of the sections, and the column under the section outline 112 indicate the operations of the corresponding sections. A dynamic loading system is a system for determining the address of a shared library, as an execution binary program, to be used for the first time in executing a program. In view of this, in the dynamic loading system, it is required to perform relocation processing, in other words, perform address resolution on symbols to be used. The multiple sections shown in FIG. 3 are utilized to perform relocation processing or perform symbol address resolution.

For instance, taking some representative examples of the sections, a ".dynstr" section retains a symbol character string to be used in dynamic link in the execution binary program. A ".dynsym" section administers symbol information relating to dynamic link in the execution binary program with respect to each of the symbols, points a character string in the ".dynstr" section, and retains other symbol information such as a value or size information. A series of sections starting with a prefix ".rel" are relocation sections for administering relocation information. These sections point an area where a targeted symbol is to be relocated within the execution binary program, and points a predetermined entry in the ".dynsym" section to specify the targeted symbol for relocation. There are other sections relating to symbol information such as a ".hash" section for retrieving symbols, and ".gnu.version" sections indicating version types of symbols.

The above description has been made by taking an example of ELF format as the execution format. Other execution formats adopt the similar configuration as the ELF format, and include sections having the similar operations as those of the ELF format.

Figure 4:
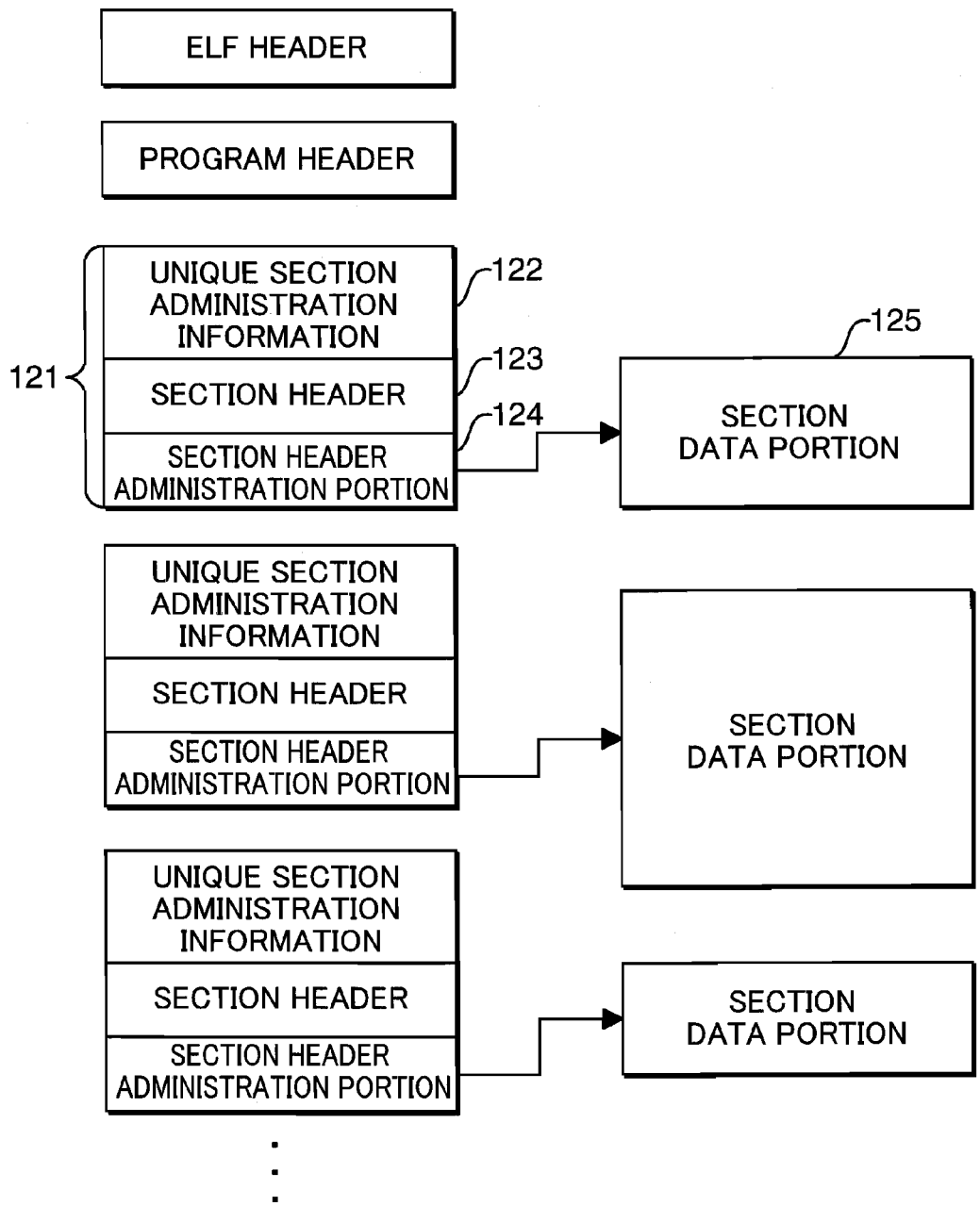
FIG. 4 is a diagram showing an example of an internal administration structure of information on the execution binary program to be administered by an execution binary reader.

In response to input of the execution binary program having the above configuration, the execution binary reader 1 reads information on the execution binary program in accordance with the execution format, and internally administers the structure of the information on the execution binary program. This facilitates analysis or reconfiguration of the execution binary program. FIG. 4 is a diagram showing an example of an internal administration structure of information on the execution binary program to be administered by the execution binary reader 1.

As shown in FIG. 4, the execution binary reader 1 reads information on the ELF header and the program header, which is one-and-only information in the execution binary program, respectively, and administers information relating to the entirety of the execution binary program. Also, the execution binary reader 1 administers each of the sections by utilizing a section administration structure 121 to be generated with respect to each of the sections. The section administration structure 121 includes unique section administration information 122, a section header 123, and a section data administration portion 124. The section data administration portion 124 administers a section data portion 125 where live data of the section is located. The unique section administration information 122 administers information relating to the corresponding section, including the section data administration portion 124, the section data portion 125, and the section header 123.

The internal administration structure of the execution binary program exemplified in this embodiment is a mere example. As far as a structure is capable of administering information relating to the entirety of the execution binary program and the sections, any structural arrangement may be applied.

In response to input of the execution binary program, the execution binary reader 1 reads the internal configuration information on the execution binary program, and then, as shown in FIG. 4, builds the internal administration structure of the internal information on the execution binary program, and outputs the internal administration structure to the deletable area detector 2. With use of the internal administration structure, the deletable area detector 2 is capable of acquiring and analyzing information on the sections.

The deletable area detector 2 receives the internal configuration information i.e. the internal administration structure of the execution binary program from the execution binary reader 1, analyzes relocation information/symbol information to be utilized in symbol address resolution, detects a deletable area from the relocation information/symbol information, and outputs, to the execution binary rewriter 3, information on the detected deletable area with the internal configuration information on the execution binary program.

Normally, in a generally available dynamic loading system, when the execution binary program is executed for the first time, the address of the program main body and a shared library to be used is determined, and symbol address resolution is performed. Normally, if relocation information/symbol information is deleted, the program may be inoperable, because the relocation information/symbol information is utilized in performing symbol address resolution.

Figure 5:
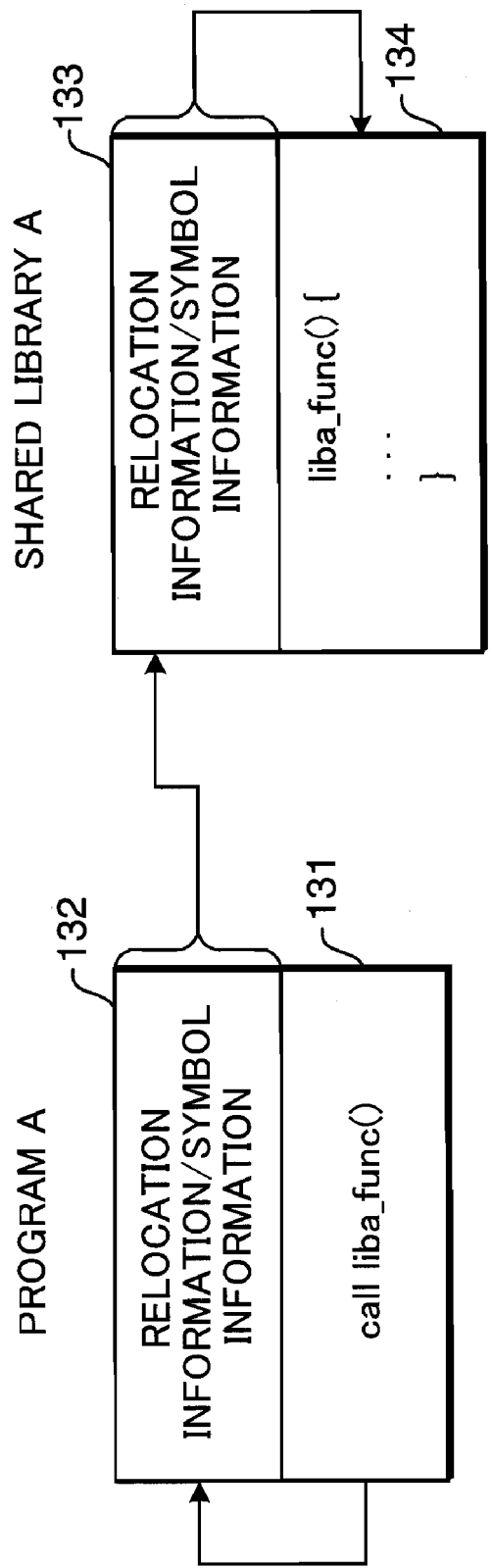
FIG. 5 is a schematic diagram for describing a control flow to be executed in performing address resolution on symbols.

A control flow to be executed in performing symbol address resolution is described referring to FIG. 5. FIG. 5 is a diagram for describing a control flow to be executed in performing symbol address resolution. In the case where a certain program A calls a liba_func function 134 in a shared library A, the position of the shared library A in the address space is unfixed until the program A is executed. Only after the program A is executed, and the position of the shared library A is determined, the position of the liba_func function 134 is determined for the first time. Then, an area 131 in the program A calling the liba_func function 134 is specified based on relocation information/symbol information 132 in the program A. Further, the position of the liba_func function 134 in the shared library A is determined by relocation information/symbol information 133 in the shared library A. This arrangement enables to perform proper jump from the program A to the liba_func function 134.

In an execution binary program where symbol address resolution has not been completed, relocation information/symbol information may be used in executing the program. However, the execution binary reader 1 of the embodiment is capable of using the execution binary program where symbol address resolution has been completed, as an input.

Further, the execution binary reader 1 checks whether address resolution has been completed in the execution binary program at the time of input of the execution binary program, and outputs address resolution judgment information indicating whether address resolution has been completed to the deletable area detector 2. Upon receiving the address resolution judgment information read by the execution binary reader 1, the deletable area detector 2 judges whether the address resolution judgment information indicates address resolution completion. If the deletable area detector 2 judges that address resolution has not been completed in the execution binary program, the deletable area detector 2 is inoperative to detect the relocation information/symbol information in the execution binary program, as a deletable area.

Figure 6:
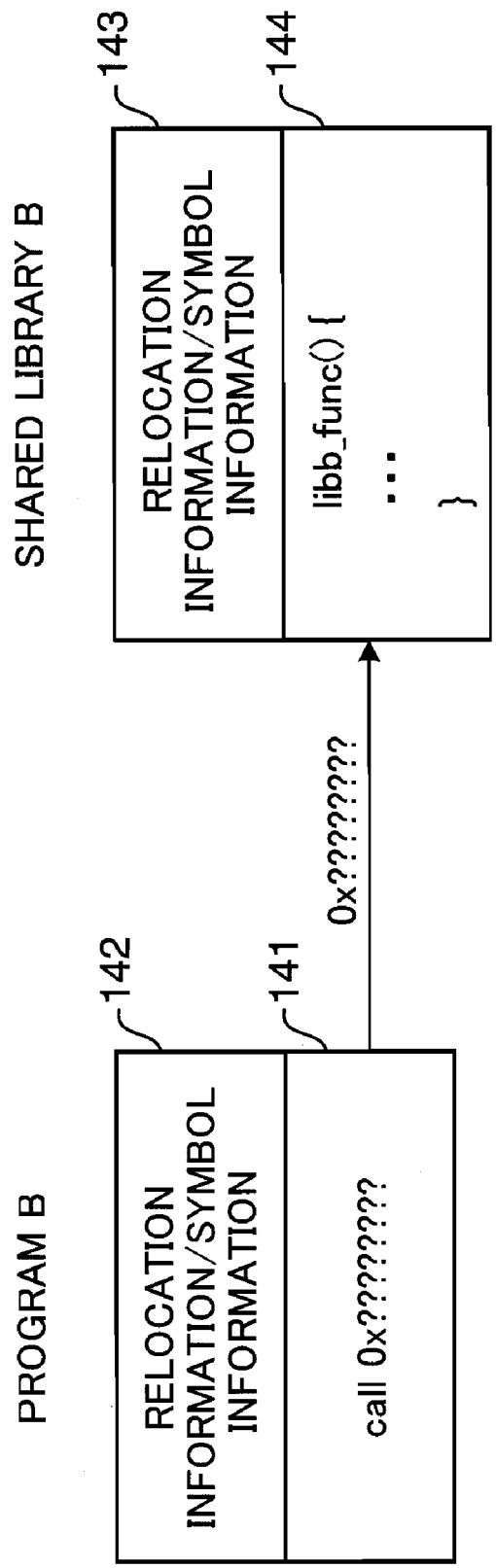
FIG. 6 is a schematic diagram for describing a function call of the execution binary program, in which address resolution has been completed.

An example of the function call of the execution binary program is described. FIG. 6 is a schematic diagram for describing a function call of the execution binary program where address resolution has been completed. A program B shown in FIG. 6 initially includes an area 141 which calls a libb_func function 144 in a shared library B. The position of the shared library B in the address space is already determined before the program B/shared library B is executed. In view of this, an address (in FIG. 6, indicated by "0x????????") is directly written in the function call area 141 in the program B for enabling jump to the libb_func function 144 prior to execution. In this arrangement, there is no likelihood that the relocation information/symbol information 142 in the program B, and the relocation information/symbol information 143 in the shared library B, which have been utilized for address resolution in FIG. 5, may be used.

In the above arrangement, even if the execution binary program in which symbol address resolution has been completed is inputted to the execution binary reader 1, the deletable area detector 2 detects a part of the relocation information/symbol information necessary for symbol address resolution as a deletable area, and the detected deletable area is outputted to the execution binary rewriter 3, the execution binary rewriter 3 outputs a properly running execution binary program.

This embodiment has been described by taking an example of the function call. Address resolution for variable reference or other address resolution are performed by the similar configuration as the function call.

The execution binary program in which symbol address resolution has been completed is creatable by utilizing an execution binary program that has been originally created for a dynamic loading system. In the following, described is an example of a method for creating an execution binary program, in which symbol address resolution has been completed.

First, address spaces of all the shared libraries have to be predefined in such a manner that the address spaces are not overlapped. This is because a shared library may be referred to by multiple application programs or the other shared library or libraries, and the position of the respective shared libraries in the address space has to be uniquely defined in the entirety of the system. If the address spaces of multiple shared libraries are overlapped, in the case where an application program utilizing the shared libraries designates a specific address space, it may be impossible to determine which shared library the designated specific address space belongs to. This may necessitate address relocation of the shared libraries.

In the case where all the application programs designate a specific address space, as far as the shared libraries are uniquely specified, the address spaces of a part of the shared libraries may be overlapped.

Further alternatively, address spaces of all the application programs may be defined in such a manner that the address spaces of the application programs are not overlapped, or conversely, address spaces of the application programs may be overlapped, in addition to the arrangement that the address spaces of all the shared libraries are defined in such a manner that the address spaces of the shared libraries are not overlapped.

Once the address spaces of all the shared libraries are defined, all the addresses of symbols in the shared libraries are defined. This enables to perform, in advance, symbol address resolution in all the execution binary programs i.e. the application programs and the shared libraries.

Taking an example of the address resolution method, an application program is loaded in an address space, and a shared library to be used by the application program is also loaded in the address space. Then, symbol address resolution is performed by the predefined address, utilizing the relocation information/symbol information in the application program, and the relocation information/symbol information in the loaded shared library. Then, a result of address resolution is written back as information on the execution binary program. The above operation is executed with respect to all the application programs, and results on address resolution are written back as information on all the execution binary programs. Implementing this method enables to obtain the execution binary program as shown in FIG. 6, in which symbol address resolution has been completed.

The deletable area detector 2 acquires internal configuration information on the execution binary program from the execution binary reader 1, analyzes the relocation information/symbol information, and detects a deletable area by referring to a judgment requirement indicating whether deletion is executable.

Figure 7:
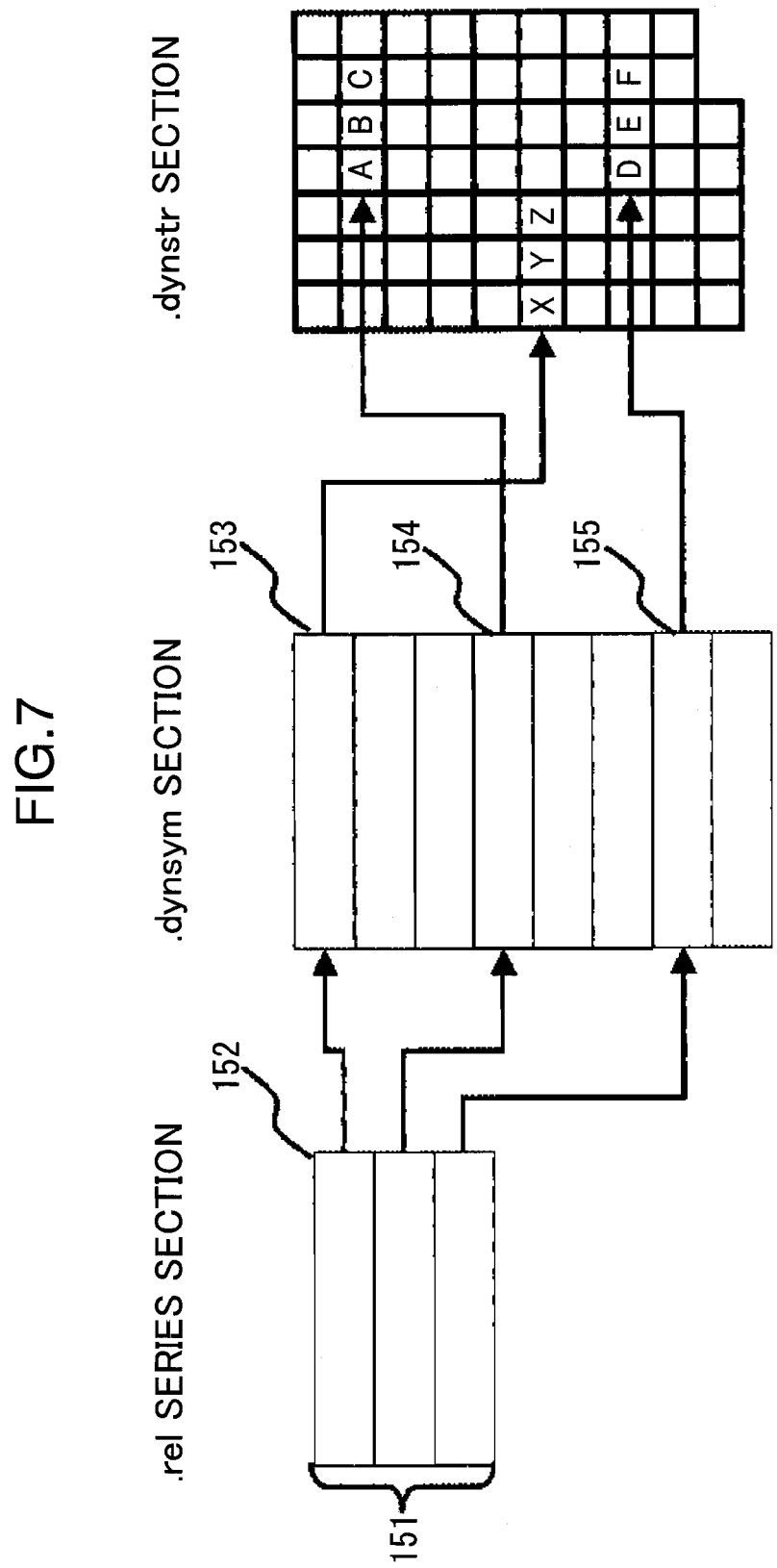
FIG. 7 is a diagram showing relations between ".rel" section, ".dynsym" section, and ".dynstr" section.

The judgment as to whether deletion is executable is basically performed based on a judgment whether a targeted section corresponds to relocation information/symbol information to be used in symbol address resolution. The judgment requirement as to whether deletion is executable is described referring to FIG. 7, which shows relations between a ".rel" series section corresponding to relocation information and starting with a prefix ".rel", a ".dynsym" section for administering symbol information, and a ".dynstr" section including a character string serving as a symbol name. FIG. 7 is a diagram showing relations between the ".rel" series section, the ".dynsym" section, and the ".dynstr" section.

In the example of FIG. 7, three entries 151 are defined in the ".rel" series section, and the three entries respectively point individual entries in the ".dynsym" section. Each entry in the ".dynsym" section points a character string in the ".dynstr" section to specify a symbol character string.

In the example of FIG. 7, the entry 152 in the ".rel" series section points the entry 153 in the ".dynsym" section, and the entry 153 in the ".dynsym" section points the character string "XYZ" in the ".dynstr" section.

The deletable area detector 2 detects all the entries in the ".rel" series section corresponding to relocation information to be used in symbol address resolution, as a deletable area. The deletable area detector 2 also detects all the entries in the ".dynsym" section traceable from the ".rel" series section, as a deletable area. The deletable area detector 2 further detects a character string, detected as the deletable area, in the ".dynstr" section pointed from the ".dynsym" section, as a deletable area.

In the example of FIG. 7, the ".rel" section 151 including the three entries, the three entries 153, 154, and 155 in the ".dynsym" section pointed from the three entries in the ".rel" section 151, and the three character strings "ABC", "XYZ", and "DEF" in the ".dynstr" section pointed from the entries 153, 154, and 155 are detected as a deletable area.

In the case where the character string in the ".dynstr" section derived from the ".rel" series section is referred to, and the referred character string is a character string starting with a character other than the alphabets, the deletable area detector 2 may have a judgment requirement indicating that the character string starting with the character, and the section pointing the character string are removed from an object to be deleted. This is because a character string e.g. starting with the underscore "_" other than the alphabets is used for internal generation, and may have no relation to symbol address resolution. The criteria on which character string is to be removed from an object to be deleted in detecting a character string as a deletable area may be used in executing a character string deletion hereinafter in the similar manner as described above.

The deletable area detector 2 may have a judgment requirement that a character string in the ".dynstr" section which is not pointed from the ".rel" series section but which is directly pointed from the ".dynsym" section, and an entry in the ".dynsym" section pointing the character string in the ".dynstr" section, are detected as a deletable area, in addition to the symbol information derived from the ".rel" series section corresponding to the relocation information.

In the above modification, a symbol, which has been exported so that an external execution binary program other than the currently running execution binary program may use the function of the currently running execution binary program, is registered in the entry of the ".dynsym" section. The symbol is an object to be retrieved in performing symbol address resolution by the external execution binary program. In this arrangement, the character string which is directly pointed from the ".dynsym" section in the aforementioned manner as symbol information for address resolution, and the ".dynsym" section can be defined as a deletable area.

The ".dynsym" section, however, includes symbol information which is inherent to the execution binary program and which has no relation to address resolution. In view of this, in using the judgment requirement that a character string directly pointed from the ".dynsym" section, and the ".dynsym" section are defined as a deletable area, symbol information having no relation to address resolution may be removed from an object to be deleted. For instance, a symbol having a type attribute "NOTYPE" may be removed from an object to be deleted. Further alternatively, symbol information in which the type attribute of symbol represents a data object or a code object may be exclusively detected as a deletable area.

Further alternatively, a judgment requirement may be used, wherein a judgment result that the symbol represents a global scope, or a judgment result that a relevant section is one of ".text" section, ".rodata" section, ".data" section, and ".bss" section indicates that deletion is executable.

The deletable area detector 2 may also analyze and administer symbol information in the execution binary program to facilitate judgment as to whether the aforementioned symbol information corresponds to a deletable area.

In order to delete symbol information, administering information concerning one symbol facilitates judgment as to whether the symbol is deletable, and administration with respect to symbol information. In the case where the execution binary program includes an internal administration structure of symbol information, the execution binary rewriter 3 is enabled to easily reconfigure the execution binary program by rewriting the execution binary program.

Figure 8:
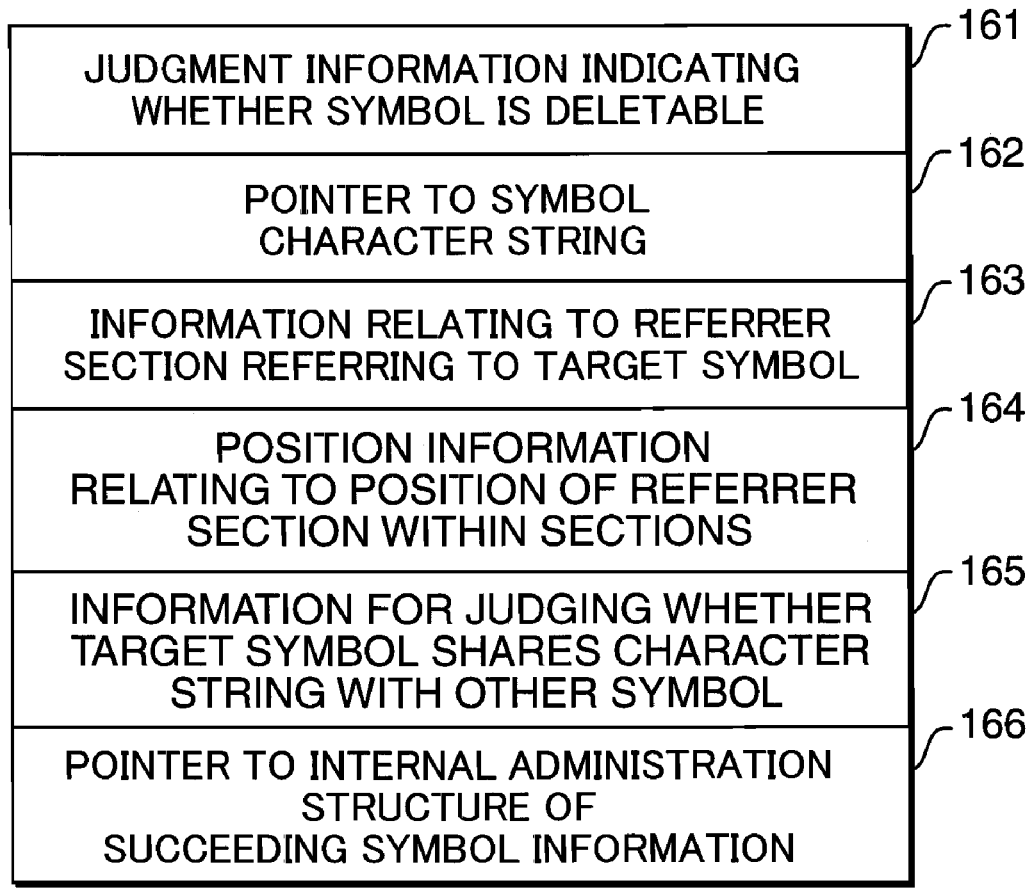
FIG. 8 is a diagram showing an example of an internal administration structure of symbol information.

FIG. 8 is a diagram showing an example of the internal administration structure of symbol information. The internal administration structure of symbol information shown in FIG. 8 is adapted to administer symbol information on a certain symbol. The internal administration structure has a pointer 166 for linking to an internal administration structure of succeeding symbol information. With use of the pointer 166, the internal administration structures of the individual symbol information can be traced by way of a link structure.

The internal administration structure of symbol information shown in FIG. 8 includes judgment information 161 indicating whether a symbol is deletable. The judgment information 161 indicating whether symbol information to be administered is deletable can be updated and administered in accordance with a judgment requirement indicating whether symbol information is deletable.

The internal administration structure of symbol information also includes a pointer 162 for pointing a symbol character string to determine which symbol the administration is made for. The internal administration structure of symbol information also includes section information 163 relating to a section which refers to the targeted symbol, and position information 164 relating to the position of the targeted section within the sections. With use of these information, administration can be performed as to by which section and from which position in the sections, the currently administered symbol is referred to.

Figure 9:
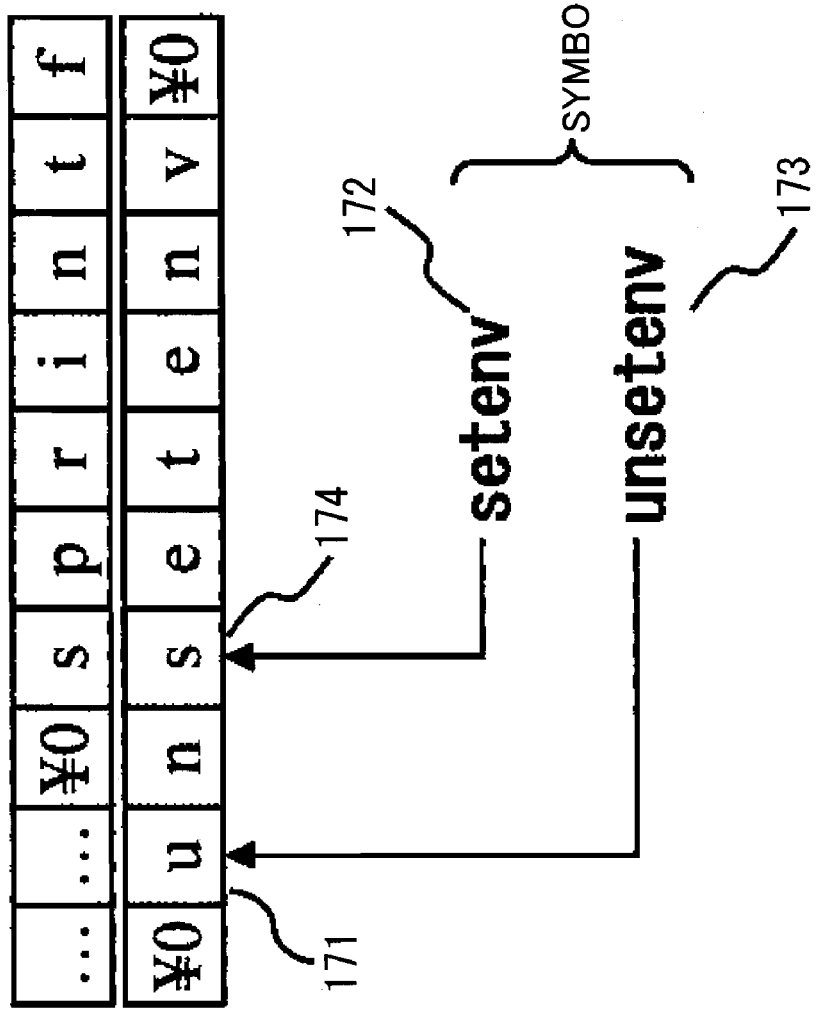
FIG. 9 is a schematic diagram for describing an operation to be executed in the case where a character string is shared by multiple symbols in the execution binary program.

The internal administration structure of symbol information may further include information for judging whether the targeted character string is shared by the other symbol. This is because multiple symbols may share a certain character string in the ".dynstr" section of the execution binary program. FIG. 9 is a schematic diagram for describing an operation to be executed in the case where multiple symbols in the execution binary program share a certain character string.

Referring to FIG. 9, the ".dynstr" section for retaining a symbol character string in the execution binary program includes a character string "unsetenv". The execution binary program includes a symbol "setenv" 172, and a symbol "unsetenv" 173. In this case, the symbol "setenv" 172 coincides with a symbol character string i.e. a tail end of the symbol "unsetenv" 173. In this case, the symbol character string is shared in the execution binary program.

In the case where a character string is shared, as shown in FIG. 9, the symbol "unsetenv" 173 ordinarily represents a lead end 171 of the symbol character string "unsetenv" in the execution binary program, and the symbol "setenv" 172 represents a lead end 174 of a symbol character string "setenv" in the symbol character string "unsetenv".

As described above, in the case where multiple symbols share a certain character string in the execution binary program, even if one of the symbols is judged to be deletable, unless the other of the symbols is judged to be deletable, the symbol character string and the associated symbol information cannot be deleted. For instance, in the example of FIG. 9, even if the symbol "unsetenv" 173 is judged to be deletable, if the symbol character string "unsetenv" in the execution binary program is deleted, the character string to be pointed from the symbol "setenv" sharing the character string "unsetenv" may also be deleted.

In order to solve the above problem, the internal administration structure of symbol information includes character string sharing information 165 for judging whether a targeted symbol shares a character string with other symbol. For instance, the number of symbols sharing a character string may be recorded, or administration may be performed as to whether a shared portion starts from a lead end or a position other than the lead end in the character string. In judging whether a symbol is deletable, the deletable area detector 2 refers to the character string sharing information 165 in the internal administration structure of symbol information, and detects symbol information as a deletable area, if it is judged that all the symbols sharing the targeted character string are deletable. Alternatively, in the case where it is judged that a part of a character string in the entirety of the character string shared by the symbols is deletable, the part of the character string, and symbol information relating to the part of the character string may be detected as a deletable area.

Figure 10:
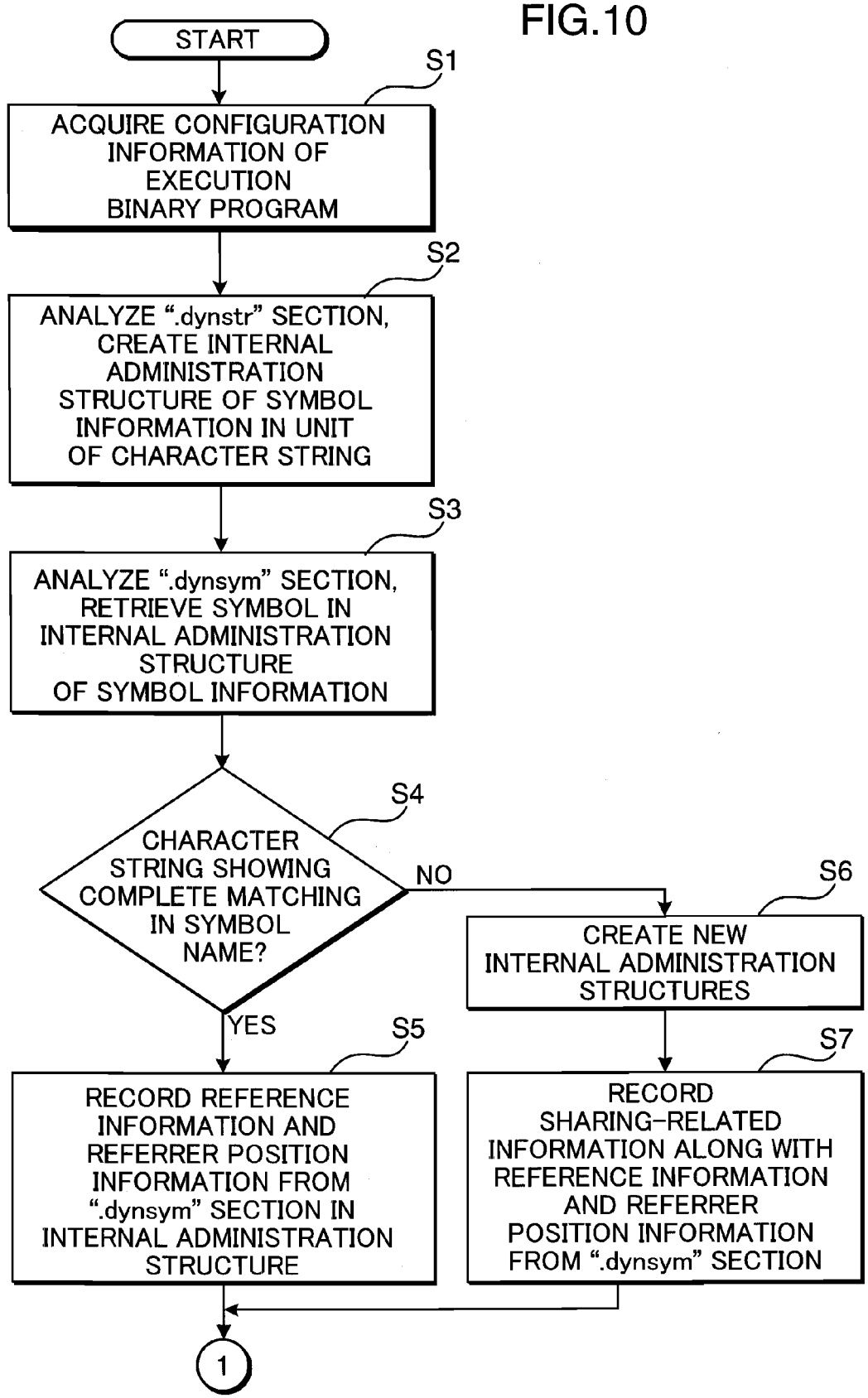
FIG. 10 is a first part of a flowchart showing an example of an operation for creating the internal administration structure of symbol information.
Figure 11:
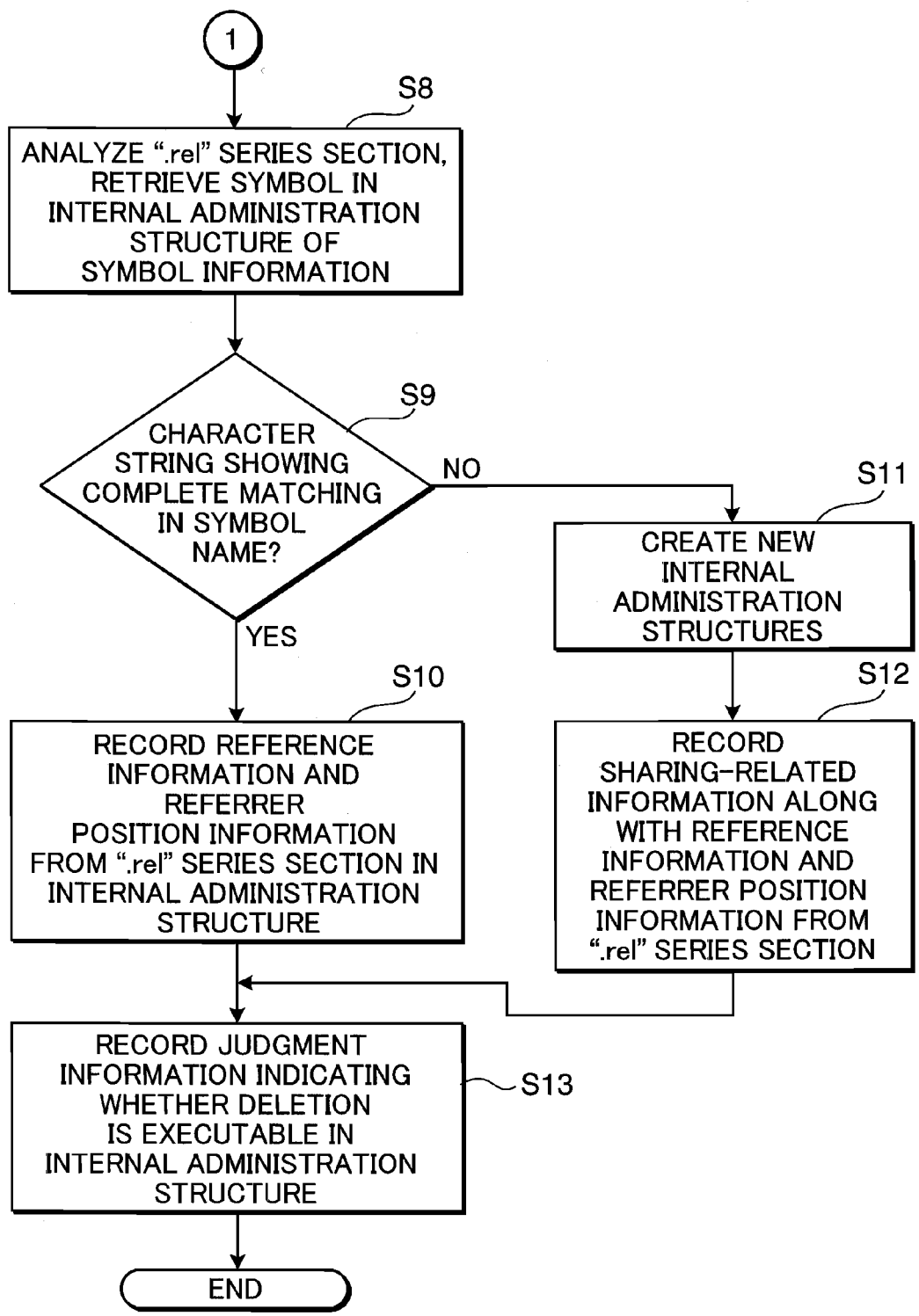
FIG. 11 is a second part of the flowchart showing the example of the operation for creating the internal administration structure of symbol information.

In the following, an operation to be executed by the deletable area detector 2 in receiving internal configuration information of the execution binary program from the execution binary reader 1, and creating an internal administration structure of symbol information is described. FIGS. 10 and 11 are a set of flowchart showing an example of an operation of creating an internal administration structure of symbol information.

First, the deletable area detector 2 acquires configuration information of the execution binary program from the execution binary reader 1 (Step S1). Then, the deletable area detector 2 analyzes the ".dynstr" section, and creates an internal administration structure of symbol information in the unit of character string (Step S2). Thereby, the internal administration structure of symbol information is created with respect to each of the character strings retained in the execution binary program.

Then, the deletable area detector 2 crosschecks with the symbol name to be accessed from the respective sections to administer section information which refers to the symbol by the internal administration structure of symbol information.

First, the deletable area detector 2 analyzes the ".dynsym" section, and retrieves an obtained symbol name in the internal administration structure of symbol information (Step S3). Then, the deletable area detector 2 judges whether the internal administration structure of symbol information includes a character string which shows complete matching in the symbol name accessed from the ".dynsym" section (Step S4). If it is judged that the internal administration structure of symbol information includes a character string which shows complete matching in the symbol name (YES in Step S4), the deletable area detector 2 records reference information indicating that reference is made from the ".dynsym" section, and referrer position information indicating the position of the referrer section in the internal administration structure of symbol information which administers the matching character string to enable symbol information deletion (Step S5).

If, on the other hand, partial matching in the symbol name is detected, in place of complete matching (NO in Step S4), it is judged that the symbol showing the partial matching shares a character string with the other symbol. Then, the deletable area detector 2 creates new internal administration structures for the symbols showing the partial matching (Step S6). Then, the deletable area detector 2 records information relating to sharing, along with the reference information and the referrer position information from the ".dynsym" section in both of the newly created internal administration structures of symbol information relating to the symbols showing the partial matching (Step S7).

The deletable area detector 2 performs operations, with respect to a ".rel" series section, similar to the operations from Step S4 to Step S7 with respect to the ".dynsym" section. In other words, the deletable area detector 2 analyzes the ".rel" series section, and retrieves an obtained symbol name in the internal administration structure of symbol information (Step S8).

Then, the deletable area detector 2 judges whether the internal administration structure of symbol information includes a character string which shows complete matching in the symbol name accessed from the ".rel" series section via the ".dynsym" section (Step S9). If it is judged that the internal administration structure of symbol information includes a character string which shows complete matching (YES in Step S9), the deletable area detector 2 records reference information indicating that reference is made from the ".rel" series section, and referrer position information indicating the position of the referrer section in the internal administration structure of symbol information which administers the matching character string to enable symbol information deletion (Step S10). If necessary, the deletable area detector 2 records information on the ".dynsym" section through which the access has been made.

If, on the other hand, partial matching in the symbol name is detected, in place of complete matching (NO in Step S9), it is judged that the symbol showing the partial matching shares a character string with the other symbol. Then, the deletable area detector 2 creates new internal administration structures for the symbols showing the partial matching (Step S11). Then, the deletable area detector 2 records information relating to sharing, along with the reference information and the referrer position information from the ".rel" series section in both of the newly created internal administration structures of symbol information relating to the symbols showing the partial matching (Step S12). If necessary, the deletable area detector 2 records information on the ".dynsym" section through which the access has been made.

Finally, the deletable area detector 2 records judgment information indicating whether deletion is executable in accordance with a judgment requirement indicating whether deletion is executable in the internal administration structure of symbol information (Step S13).

Alternatively, either one of the series of operations from Step S3 to Step S7 concerning the ".dynsym" section shown in FIG. 10, or the series of operations from Step S8 to Step S12 concerning the ".rel" series section shown in FIG. 11 may be executed depending on the judgment requirement indicating whether deletion is executable.

For instance, if the judgment requirement indicating whether deletion is executable is a requirement that symbol information is derived from the ".rel" series section, and that all the shared symbols can be deleted, the series of operations from Step S3 to Step S7 concerning the ".dynsym" section shown in FIG. 10 may be omitted. Further alternatively, concerning the sections other than the "rel." series section and the ".dynsym" section, it is possible to perform operations similar to the series of operations from Step S3 to Step S7 concerning the ".dynsym" section shown in FIG. 10 prior to the operation of Step S13 shown in FIG. 11.

In other words, concerning the other sections which access the targeted symbol in executing the program, it is advantageous to include a series of operations similar to the aforementioned operations concerning the ".rel" series section and the ".dynsym" section, and record reference information from the other sections in the internal administration structure of symbol information. This is because the other sections may access symbol information at the time of executing the program, irrespective of symbol address resolution. Under the above circumstances, if symbol information is deleted merely based on a reason that the symbol information is referred to by the ".rel" series section, for instance, the program may be inoperable at the time of execution, because the symbol corresponding to the symbol information is deleted from the program. Some examples of the other sections are a ".dynamic" section for administering various dynamic link information, ".gnu.version" series section for administering symbol versions, and a ".gnu.liblist" section for retaining library information.

The deletable area detector 2 may adopt a requirement that symbol information to be referred to by the aforementioned sections is removed from an object to be deleted, as the judgment requirement indicating whether deletion is executable. The modified arrangement enables to finely delete symbol information.

The deletable area detector 2 may also include a requirement that symbol information to be referred to by the other execution binary program is removed from an object to be deleted, as a judgment requirement indicating whether deletion is executable. For instance, the following arrangement may be adopted, wherein a list of execution binary programs which are supposed to use symbol information is prepared in advance; the execution binary reader 1 reads the execution binary program list; and the deletable area detector 2 receives and analyzes symbol information on the execution binary programs, detects symbol information to be referred to by the other execution binary program, and removes the symbol information from an object to be deleted.

The deletable area detector 2 is allowed to use the aforementioned various judgment requirements, record information indicating that symbol deletion is executable in the internal administration structure of symbol information which has satisfied the predefined judgment requirement, and output the internal administration of symbol information to the execution binary rewriter 3.

The internal administration structure of symbol information has been described to facilitate analysis of symbol information in the execution binary program by the deletable area detector 2. As far as analysis can be performed by tracing back relocation information/symbol information, the embodiment of the invention may adopt the other approaches.

The execution binary rewriter 3 acquires, from the deletable area detector 2, execution binary program information as a result of analysis, and deletable area information as a result of detection. The execution binary rewriter 3 receives, for instance, the internal administration structure of symbol information described in the foregoing, and the judgment information, recorded in the internal administration structure, indicating whether deletion is executable, as the deletable area information.

The execution binary rewriter 3 is operative to specify deletable relocation information/symbol information, based on the received execution binary program information and the received deletable area information. For instance, the execution binary rewriter 3 acquires the internal administration structures of symbol information, which represent sections in the execution binary program and the deletable areas in the sections, element by element, and checks the judgment information indicating whether deletion is executable. If the detected information indicates information that the targeted symbol information is deletable, the execution binary rewriter 3 is allowed to specify the targeted area to be deleted in the execution binary program by tracing back referrer section information recorded in the internal administration structure of symbol information, or a pointer to the targeted symbol character string. By executing the aforementioned operation with respect to all the elements in the internal administration structure of symbol information, all the deletable areas can be specified with respect to one execution binary program.

If, however, live data in the deletable area in the execution binary program is deleted, the internal configuration of the execution binary program may be changed, with the result that the location address of text information/data information, as a code main body of the execution binary program, may be changed. Text information/data information in the execution binary program may be referred to by other execution binary programs. In this case, it is necessary to detect an area which refers to the execution binary program where a location address change has occurred in all the execution binary programs, and correct the address to be referred to by the location address change. Without the correction, the execution binary program may be inoperable as a program. It is, however, according to the convention art, extremely difficult to detect whether the currently running binary execution program refers to a specific address in the other execution binary program, based on the code of the currently running execution binary program.

Examples of the sections whose location address change is undesirable are sections whose section attribute is "PROGBITS"; and ".plt", ".text", ".fini", ".rodata", ".data", ".ctors", ".dtors", ".got", and ".bss" sections which constitute live data in the execution binary program, if the section attribute information is not included.

In order to solve the above problem, the execution binary rewriter 3 rewrites relocation information/symbol information detected as a deletable area into specific data, in place of deleting live data itself.

For instance, the execution binary rewriter 3 acquires the internal administration structure of symbol information which is detected to be deletable. If the referrer section which refers to a targeted symbol character string, the position of the referrer section, and the position of the symbol character string can be acquired from the internal administration structure of symbol information, the execution binary rewriter 3 rewrites the area in the execution binary program into specific data. The specific data may be certain common data e.g. 0 or 0xFF. Further alternatively, the specific data may be data created based on a specific rule.

As described above, the execution binary rewriter 3 rewrites the deletable area into specific data, in place of deleting live data in the execution binary program. This enables to solve the above problem, without changing the location address of text information/data information in the execution binary program.

Finally, the execution binary image creator 4 converts the execution binary program which has undergone the rewriting by the execution binary rewriter 3 into an execution binary image recognizable on a device or a system. If the execution binary image is created by a compression technique, generally, the specific data e.g. the area which has undergone the rewriting into common data has a higher compression rate, as compared with the other data. This enables to reduce the data size of the execution binary image.

The execution binary rewriter 3 rewrites the deletable area in the execution binary program into specific data, reconfigures the ELF header/program header/section structures, as the internal configuration of the execution binary program read by the execution binary reader 1, and outputs the reconfigured result in the format of the execution binary program.

Upon input of the execution binary programs into the execution binary reader 1 one by one, the relocation information/symbol information is brought to a deletable condition, and the relocation information/symbol information in the deletable condition is outputted from the execution binary rewriter 3. Then, the execution binary image creator 4 creates an execution binary image for allowing the execution binary programs to be operable on a device or a system. For instance, a file system or a like system is introduced, and an execution binary image for the file system is created.

In creating the execution binary image, use of a compression technique is advantageous in increasing the compression rate of the area which has undergone rewriting into specific data, which enables to reduce the data size of the execution binary image. For instance, there is proposed introducing a file system capable of compressing an execution binary program. Examples of the file system are FAT (File Allocation Table), VFAT (Virtual FAT), FAT32, NTFS (NT File System), HFS (High-performance File System), ext2, ext3, ReiserFS, JFS (Journaling File System), XFS, JFFS (Journaling Flash File System) 2, and CRAMFS. Alternatively, a unique compression technique or a unique file system may be used.

In the foregoing, a method for rewriting a deletable area in the execution binary program into specific data by the execution binary rewriter 3 has been described. Additionally, it is possible to collect deletable areas in the execution binary program i.e. areas to be rewritten into specific data within a section. Collecting rewriting areas into specific data is advantageous in effectively reducing the data size of the execution binary image with a larger compression rate using a compression technique. An example of collecting rewriting areas is described referring to FIGS. 12 and 13.

Figure 12:
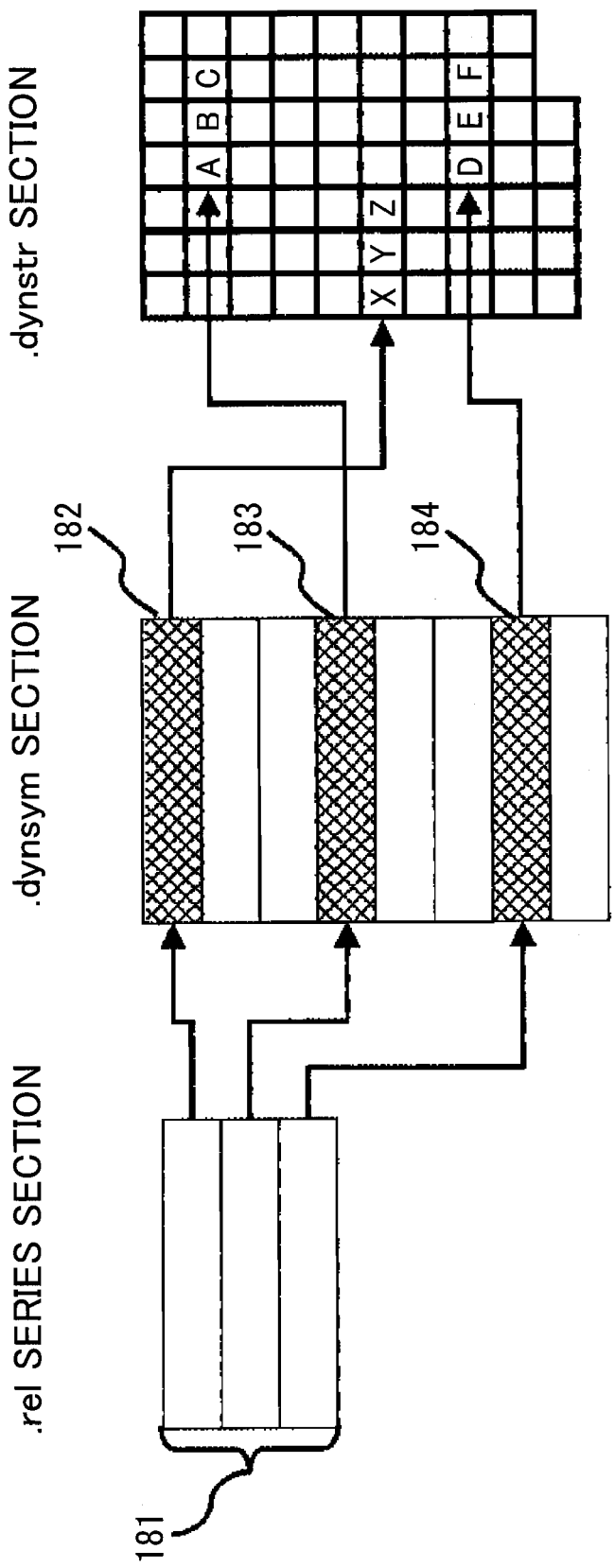
FIG. 12 is a schematic diagram for describing an operation to be executed by an execution binary rewriter in the case where areas for rewriting into specific data are not collected.
Figure 13:
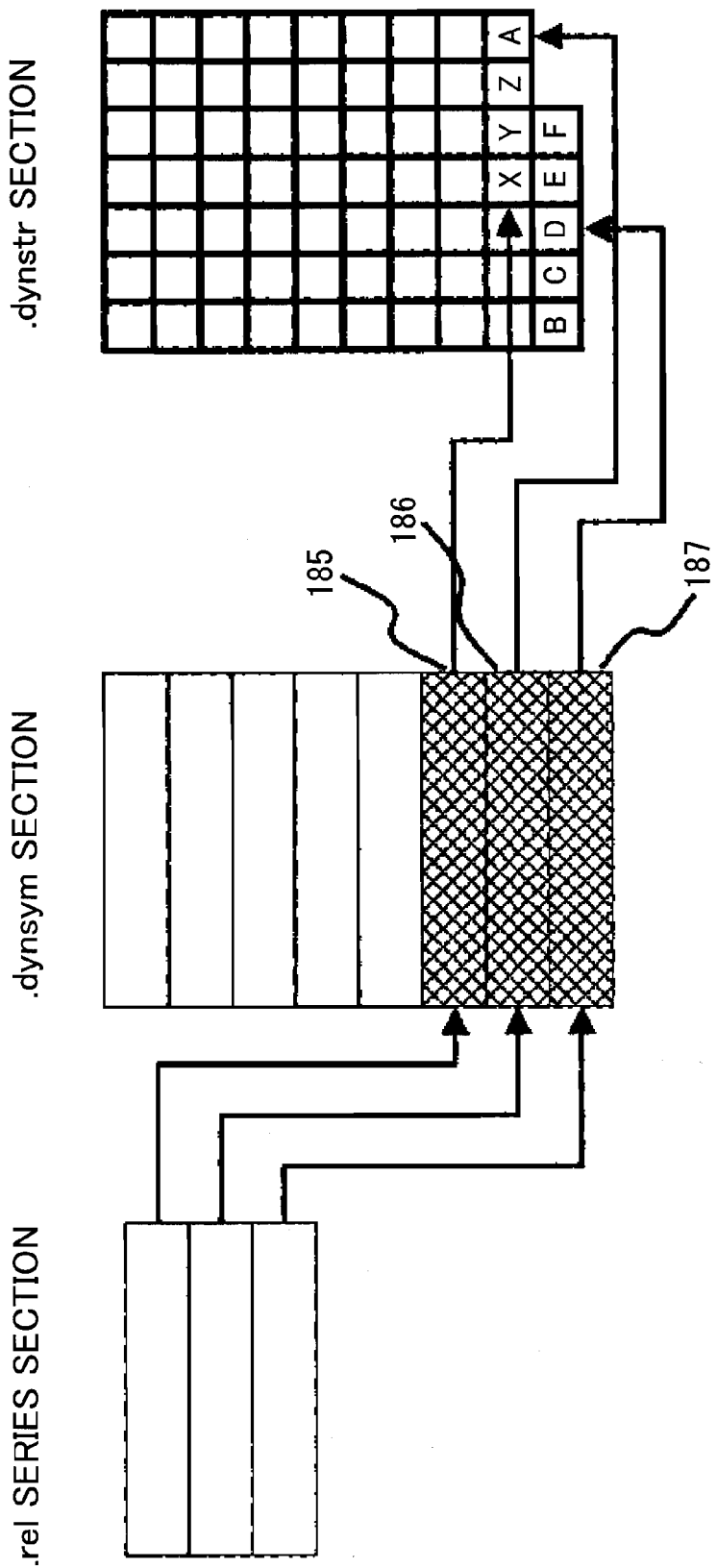
FIG. 13 is a schematic diagram for describing an operation to be executed by the execution binary rewriter in the case where areas for rewriting into specific data are collected.

FIG. 12 is a schematic diagram for describing an operation to be executed by the execution binary rewriter 3 in the case where areas for rewriting into specific data are not collected. FIG. 13 is a schematic diagram for describing an operation to be executed by the execution binary rewriter 3 in the case where areas for rewriting into specific data are collected.

Referring to FIG. 12, three entries 181 are defined in a ".rel" series section, and the three entries 181 are correlated to three entries 182, 183, and 184 in a ".dynsym" section, respectively. The entry 182 in the ".dynsym" section points a character string "XYZ" in the ".dynstr" section, the entry 183 points a character string "ABC", and the entry 184 points a character string "DEF". In FIG. 12, the execution binary rewriter 3 rewrites the entries 182, 183, and 184 in the ".dynsym" section, and the three character strings in the ".dynstr" section into specific data in accordance with judgment information indicating whether symbol information is deletable. In this case, the specific data may be discretely localized in the multiple areas i.e. the ".dynsym" section and the ".dynstr" section.

In view of the above, as shown in FIG. 13, the execution binary rewriter 3 collects three entries 185, 186, and 187 in the ".dynsym" section for rewriting into specific data at one site. The execution binary rewriter 3 also collects the three character strings in the ".dynstr" section at one site. In the example of FIG. 13, the rewriting areas are located at a tail end of the respective sections. As far as the rewriting areas can be collected at one site, the rewriting areas may be located at any position within the section. Also, the order of rewriting into specific data, and collecting the rewriting areas may be reversed.

If the areas for rewriting into specific data are collected at one site by the execution binary rewriter 3, the position of the remaining data in the section may be changed. In view of this, if the position of the remaining data is changed, the execution binary rewriter 3 corrects a referee section relating to the remaining data whose position has been changed.

First, in the case where rewriting areas in the ".dynstr" section are collected, the position of the respective entries in the section which refers to the targeted character string is corrected, depending on a change in the position of the remaining character string in the execution binary program. This may be performed by: acquiring information on the referrer section which refers to the symbol character string from the internal administration structure of symbol information acquired by the deletable area detector 2; and changing the position of the respective entries in the referrer section.

For instance, if the position of a character string is changed as result of collecting rewriting areas in the ".dynstr" section, the execution binary rewriter 3 corrects the position of the respective entries in the ".dynsym" section or the ".rel" section which refers to the character string. The execution binary rewriter 3 also corrects the position of the area which refers to the character string in the ".dynamic" section for administering dynamic link information, the ".gnu.version" sections for administering symbol versions, the ".gnu.liblist" section for retaining library information, and the ".hash" section for administering a hash structure for use in retrieving a symbol character string.

The execution binary rewriter 3 may also collect deletable areas in the execution binary program i.e. areas for rewriting into specific data with respect to the entirety of the execution binary program, in place of collecting deletable areas within the section. Collecting areas for rewriting into specific area with respect to the entirety of the execution binary program is advantageous in more efficiently collecting areas, as compared with the arrangement of collecting areas in the unit of section. Also, in the case where an execution binary image obtained by collecting rewriting areas with respect to the entirety of the execution binary program is compressed, the data size of the execution binary image can be further reduced, as compared with the arrangement of compressing the execution binary image obtained by collecting rewriting areas in the unit of section. In the following, an example of collecting rewriting areas with respect to the entirety of an execution binary program is described referring to FIG. 14.

Figure 14:
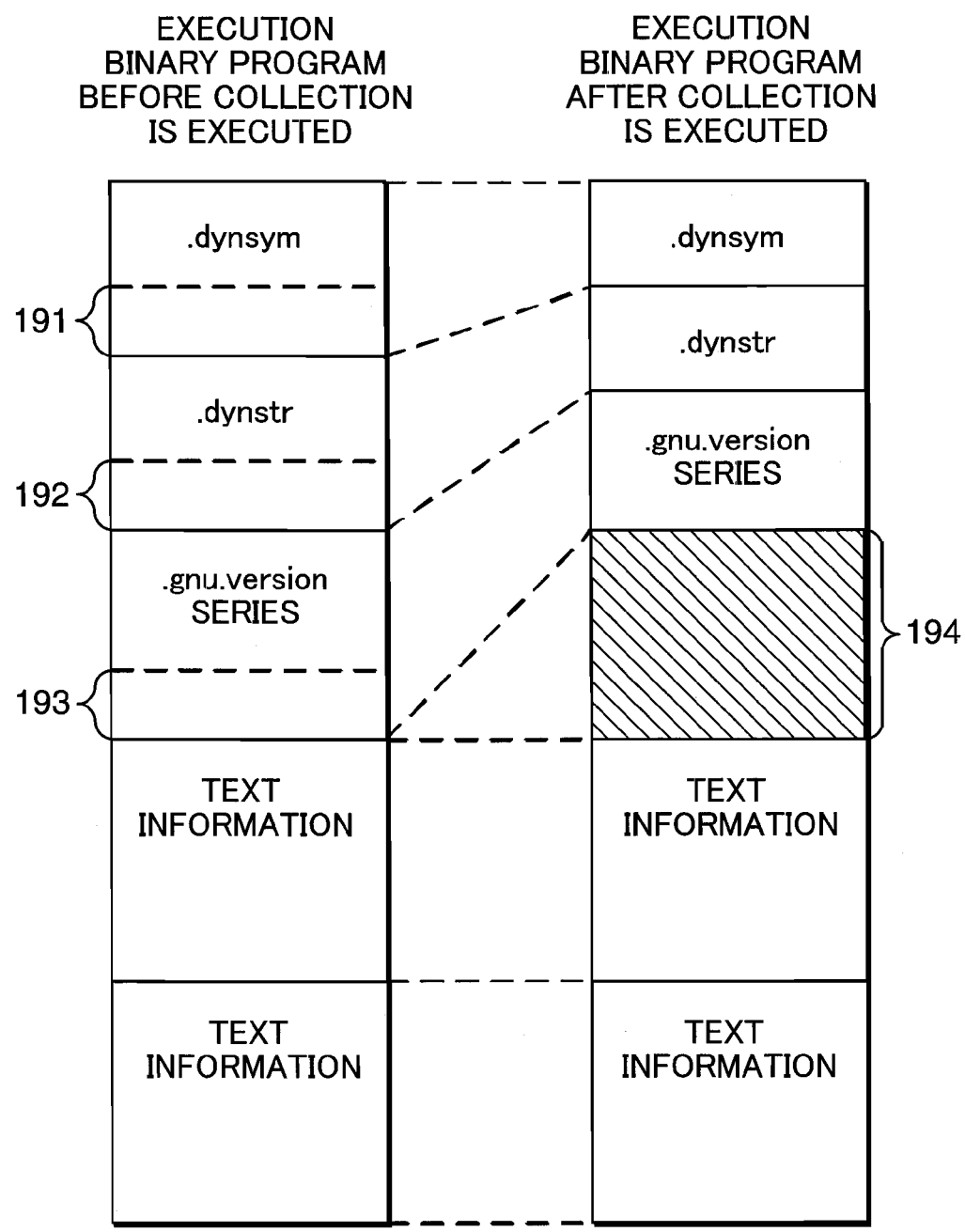
FIG. 14 is a schematic diagram for describing an operation to be executed by the execution binary rewriter in the case where areas for rewriting into specific data are collected with respect to the entirety of the execution binary program.

FIG. 14 is a schematic diagram for describing an operation to be executed by the execution binary rewriter in the case where areas for rewriting into specific data are collected with respect to the entirety of the execution binary program. In FIG. 14, a ".dynsym" section, a ".dynstr" section, and a ".gnu.version" series section are exemplified sections, in which a deletable area is rewritten into specific data. Among the three sections, assuming that portions to be rewritten into specific data by the execution binary rewriter 3 are defined as areas 191, 192, and 193, an area 194 is obtained by collecting the areas 191, 192, and 193 with respect to the execution binary program. In this operation, the location address of text information/data information in the execution binary program is not changed.

An example of a method for collecting portions for rewriting into specific data with respect to the entirety of the execution binary program, the position of a targeted section may be corrected in such a manner that a succeeding section is located immediately after the tail end (the tail end of a portion other than the specific data in the section) of the preceding section; and the portion of the specific data i.e. the deletable area which has been overwritten by shifting of the section may be collectively written out at the tail end of the section after the shifting by the data size of the specific data. The execution binary rewriter 3 may execute the above operation with respect to all the sections. The position of the section may be corrected by changing the position information on the section in the section header, for instance. The above method is a mere example. As far as the operation of collecting specific data with respect to the entirety of the execution binary program, as shown in FIG. 14, can be realized, any other method may be applied.

In the case where the execution binary rewriter 3 collects rewriting areas with respect to the entirety of the execution binary program, the position of the respective sections may be changed. In view of this, it is required to correct the information on the entirety of the execution binary program in accordance with the change in the position of the respective sections by the execution binary rewriter 3.

For instance, each section header includes the location address of the corresponding section, and offset information. Accordingly, it is required to correct the location address of the corresponding section and the offset information in accordance with a change in the position of the corresponding section by the execution binary rewriter 3. Also, concerning the program header, the sum of the data sizes of the sections belonging to the program header is calculated, and the file size and the memory size included in the program header are corrected based on the calculated sum, if the correction is necessary.

The execution binary rewriter 3 may also delete a section itself, if the deletable area information acquired from the deletable area detector 2 indicates that the entirety of the section is deletable. In this arrangement, information relating to the entirety of the execution binary program is corrected, if the correction is necessary. Also, the individual sections include information indicating that the other sections are referred to. In view of this, the execution binary rewriter 3 corrects the information indicating the above condition, if the correction is necessary. The ELF header also administers the number of sections included in the execution binary program. In view of this, it is required to correct the information on the number of sections by the execution binary rewriter 3.

In the foregoing, there has been described a method configured in such a manner that the execution binary rewriter 3 is operative to rewrite the deletable area into specific data to increase the compression rate so as to reduce the data size of the execution binary image. Alternatively, the execution binary image creator 4 may be operative to share a certain memory area in the unit of page, which has been rewritten into specific data, within a certain execution binary program or with respect to all the execution binary programs. The modification is further advantageous in reducing the data size of the execution binary image. The modified method is described referring to FIGS. 15A and 15B.

Figure 15A:
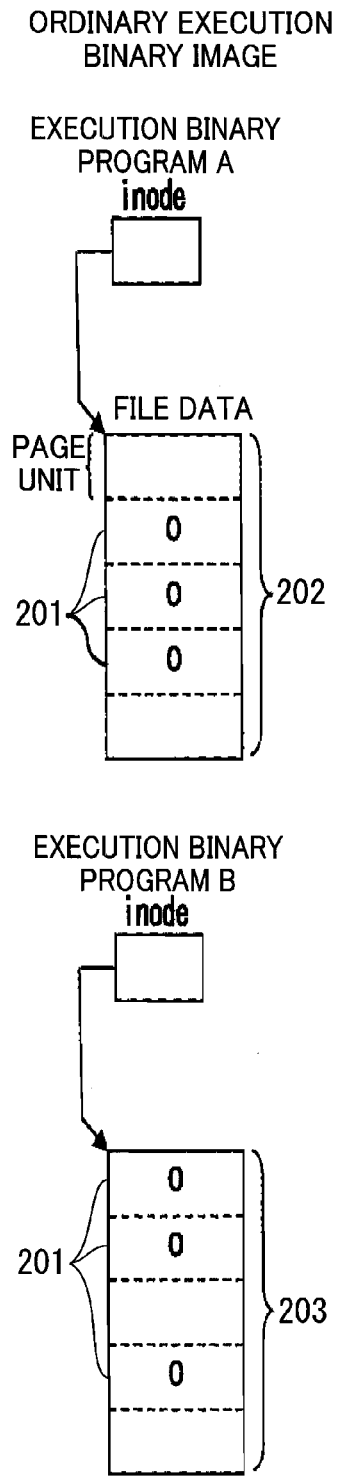
FIG. 15A is a diagram showing an example of an ordinary execution binary image created by two execution binary programs.
Figure 15B:
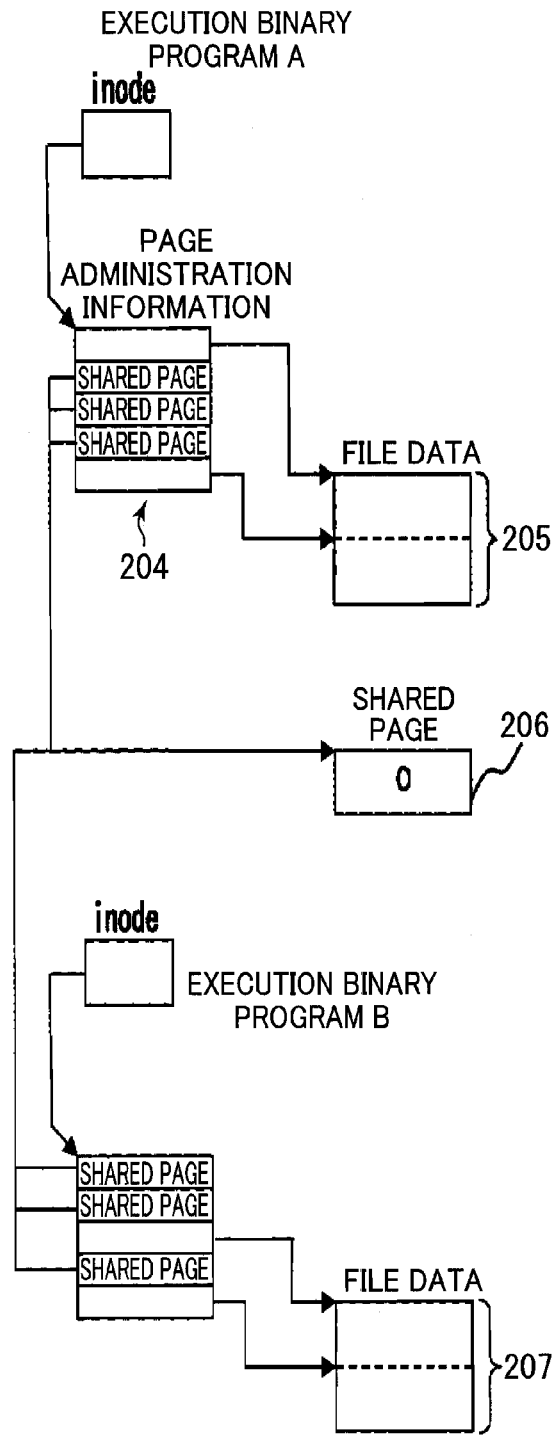
FIG. 15B is a diagram showing an example of an execution binary image created by utilizing a shared page.

FIGS. 15A and 15B are schematic diagrams for describing an operation as to how pages rewritten into specific data are shared by all the execution binary programs. FIG. 15A is a diagram showing an example of an ordinary execution binary image created by two execution binary programs, and FIG. 15B is a diagram showing an example of an execution binary image created by utilizing shared pages. FIG. 15A shows an example of an ordinary execution binary image created by two execution binary programs i.e. an execution binary program A and an execution binary program B. The file data of the execution binary programs is administered in the unit of page. The execution binary program A and the execution binary program B each has pages 201 which are rewritten into specific data represented by "0" in FIG. 15A. In an ordinary state, an execution binary image is formed of file data 202 and 203 each having a predetermined data size and including the pages 201 represented by "0".

In this embodiment, the execution binary image creator 4 is operative to create an execution binary image by utilizing shared pages as shown in FIG. 15B. Specifically, the execution binary image creator 4 creates page administration information 204 for administering file data in the execution binary program in the unit of page, and hands the created page administration information 204 to each of the execution binary programs. The execution binary image creator 4 creates an execution binary image by: defining the page administration information 204 in one of the execution binary programs in such a manner that pages rewritten into specific data i.e. the pages represented by "0" in FIG. 15A designate a single shared page 206 to be shared by multiple areas in the one of the execution binary programs; and defining the page administration information 204 in the other of the execution binary programs in such a manner that the page administration information 204 designates the same shared page 206 to be shared by multiple areas in the other of the execution binary programs.

In the above arrangement, the page administration information 204 may administer the file data in the execution binary program in the administration unit of a certain physical memory, in place of the page unit. Further alternatively, there is no need of administering a pointer pointing the shared page with respect to each of the pages rewritten into specific data i.e. the pages represented by "0" in FIG. 15A. For instance, the range of an area to be allocated to the shared page in the file data may be defined by an address offset value from a lead end of the file, or may be defined by an absolute address value.

By applying the above approach, an execution binary image which has conventionally been formed of the file data 202 and 203 each of a size corresponding to five pages can be formed of file data 205 and 207 each of a size corresponding to two pages, and the shared page 206 of a size corresponding to one page. This enables to reduce the data size of the execution binary image.

In executing the program, a device or a system is required to recognize the execution binary image created in the aforementioned manner. Typically, an operating system (OS) or a software called a basic software is operative to read and analyze an execution binary image stored in a storage medium, recognize the execution binary program to be executed, and prepare an environment for execution.

Figure 16:
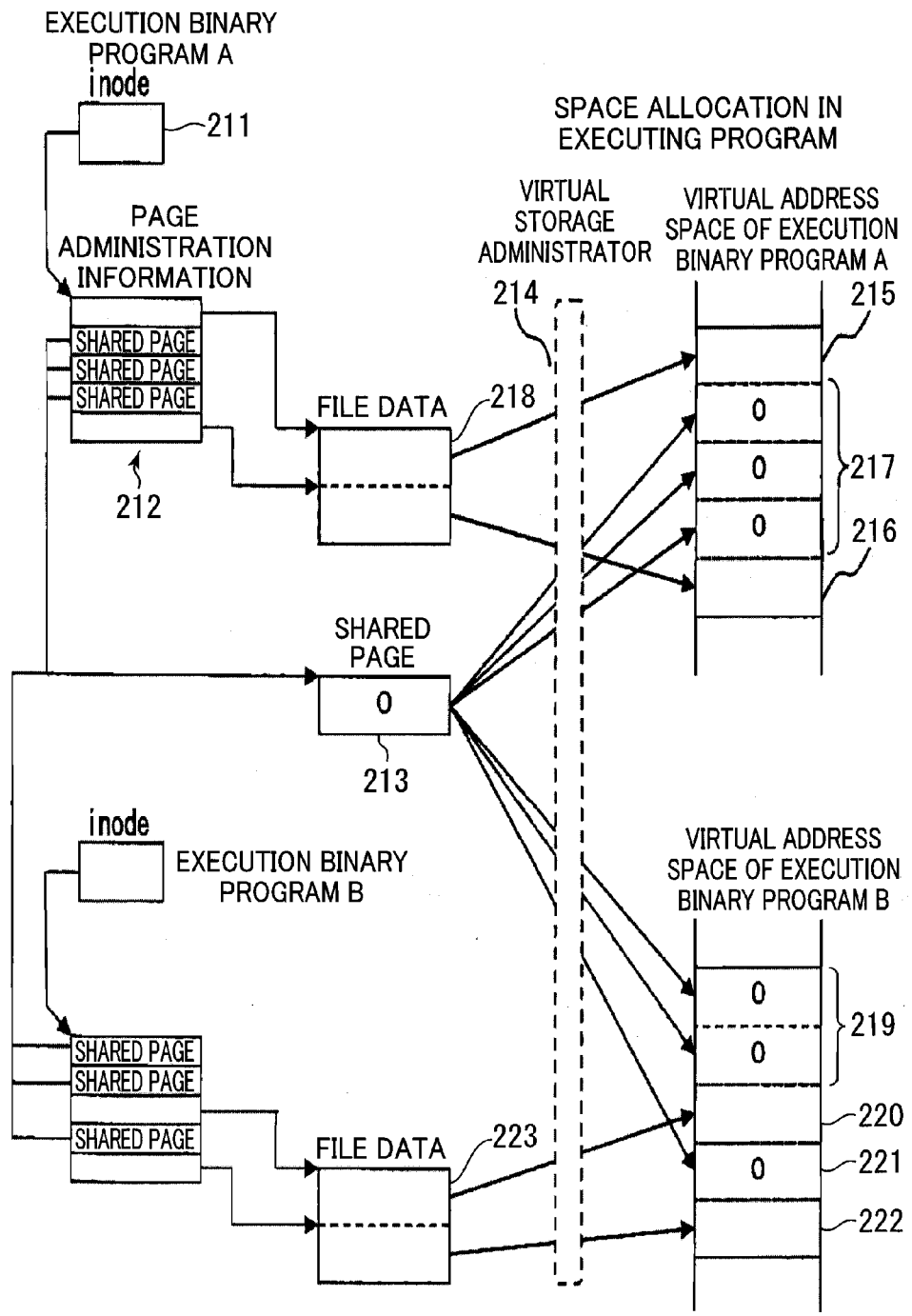
FIG. 16 is a schematic diagram for describing a relation between an execution binary image created by utilizing a shared page, and an address space in which the execution binary program is executed.

FIG. 16 is a schematic diagram for describing a relation between an execution binary image created by utilizing a shared page, and an address space in which the execution binary program is executed. In FIG. 16, upon startup of the execution binary program A, the OS specifies the information on the execution binary program A or the entity of the execution binary program A based on administration information included in the execution binary image e.g. inode 211 shown in FIG. 16. A page administration information 212 includes the administration information designating the entity of the execution binary program, or information for specifying an area using a shared page 213.

The OS reads the page administration information 212, and allocates a physical area of the execution binary image in the address space in which the program is executed. In this embodiment, a virtual address space is created by a virtual storage administrator 214 to prevent the position of e.g. the ".text" section in the execution binary program from being changed in the address space of the program. Specifically, the virtual storage administrator 214 distinguishes a page area which has undergone rewriting into specific data, from a page area which has not undergone rewriting, with respect to the execution binary program, to realize location of the entity of the original execution binary program in the virtual address space.

In the following, an example of the above arrangement is described referring to FIG. 16. In the case where the execution binary program A is developed in a virtual address space, the OS defines the virtual storage administrator 214 in such a manner that the first page of file data 218 is allocated to a first location 215 in the virtual address space of the program. Then, the OS refers to the page administration information 212, and recognizes that the succeeding three pages use the shared page 213. Then, the OS defines the virtual storage administrator 214 in such a manner that the shared page 213 is allocated to a second location 217, a third location 217, and a fourth location 217 in the virtual address space. Then, the OS defines the virtual storage administrator 214 in such a manner that the final page of the file data 218 is allocated to a final location 216 in the virtual address space. By performing the above operations, the execution binary program A is operated in the virtual address space administered by the virtual storage administrator 214.

In the similar manner as described above, in the case where the execution binary program B is developed in a virtual address space, the OS refers to the page administration information 212, and recognizes that the first and the second pages use the shared page 213. Then, the OS defines the virtual storage administrator 214 in such a manner that the shared page 213 is allocated to a first location 219 and a second location 219 in the virtual address space. Then, the OS defines the virtual storage administrator 214 in such a manner that the first page of file data 223 is allocated to a third location 220 in the virtual address space of the program. Then, the OS refers to the page administration information 212, and recognizes that the succeeding fourth page uses the shared page 213. Then, the OS defines the virtual storage administrator 214 in such a manner that the shared page 213 is allocated to a fourth location 221 in the virtual address space. Then, the OS defines the virtual storage administrator 214 in such a manner that the last page of the file data 223 is allocated to a last location 222 in the virtual address space. By performing the above operations, the execution binary program B is operated in the virtual address space administered by the virtual storage administrator 214.

By implementing the above operations, for instance, text information/data information, as an execution code main body in the execution binary program, is located at the location 216 in the virtual address space shown in FIG. 16. This enables to locate the text information/data information without changing the location address of the text information/data information in the address space, which allows an access from other execution code.

In the example of FIG. 16, the virtual storage administrator 214 allocates a physical area i.e. the shared page 213 in the execution binary image to the location 217 in the virtual address space. In the case where it is expected that there will be no access to the shared page, the program is properly operated, even if a physical area i.e. the shared page is not allocated to the location 217 in the virtual address space. Also, in the case where it is expected that no program will access a page area which has undergone rewriting into specific data, it is possible to remove the shared page from the execution binary image.

The execution binary image creating device in the embodiment is applied to an execution binary program to be executed on a computer to be loaded in various devices such as information devices, audio-visual devices, communications devices, and household electric appliances to output an execution binary image to be recognized by the computer.

Figure 17:
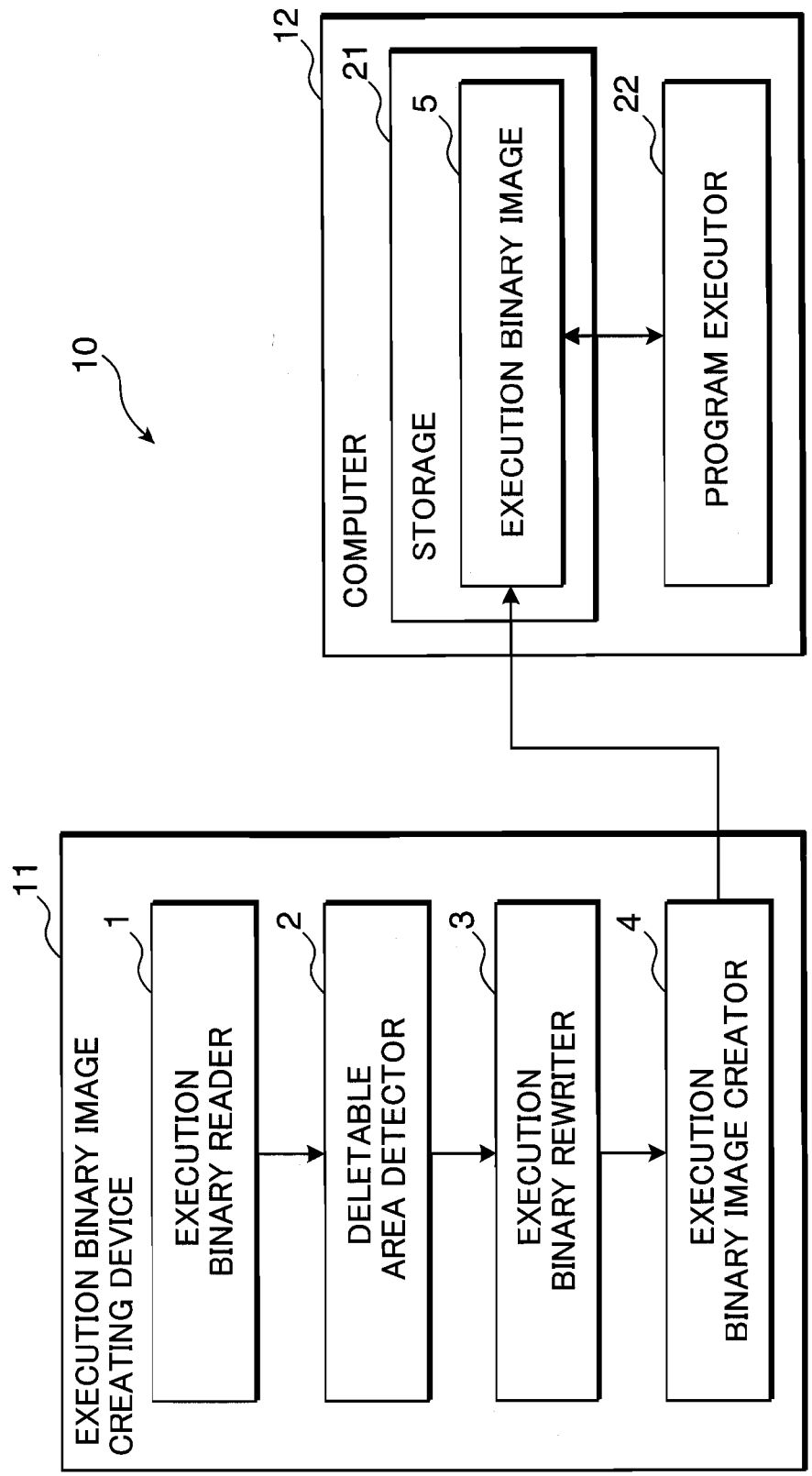
FIG. 17 is a diagram showing a configuration of an information processing system embodying the invention.

FIG. 17 is a diagram showing a configuration of an information processing system in the embodiment. An information processing system 10 shown in FIG. 17 includes an execution binary image creating device 11 and a computer 12. The configuration of the execution binary image creating device 11 is the same as that of the execution binary image creating device shown in FIG. 1. The computer 12 includes a storage 21 and a program executor 22.

The storage 21 is constituted of e.g. an ROM, and is adapted to store an execution binary image created by the execution binary image creating device 11. The program executor 22 is constituted of e.g. a CPU, and develops the execution binary image stored in the storage 21 in the virtual address space for execution. In this embodiment, the storage 21 corresponds to an example of an execution binary image storing section, and the program executor 22 corresponds to an example of an executing section. Also, in the embodiment, the execution binary image executing program is stored in e.g. an ROM to cause a CPU and an EEPROM to function as the storage 21 and the program executor 22.

As shown in FIG. 17, the execution binary image creating device 11 is externally provided with respect to the computer 12 to recognize and operate the execution binary image outputted from the execution binary image creating device 11 on the computer 12.

Figure 18:
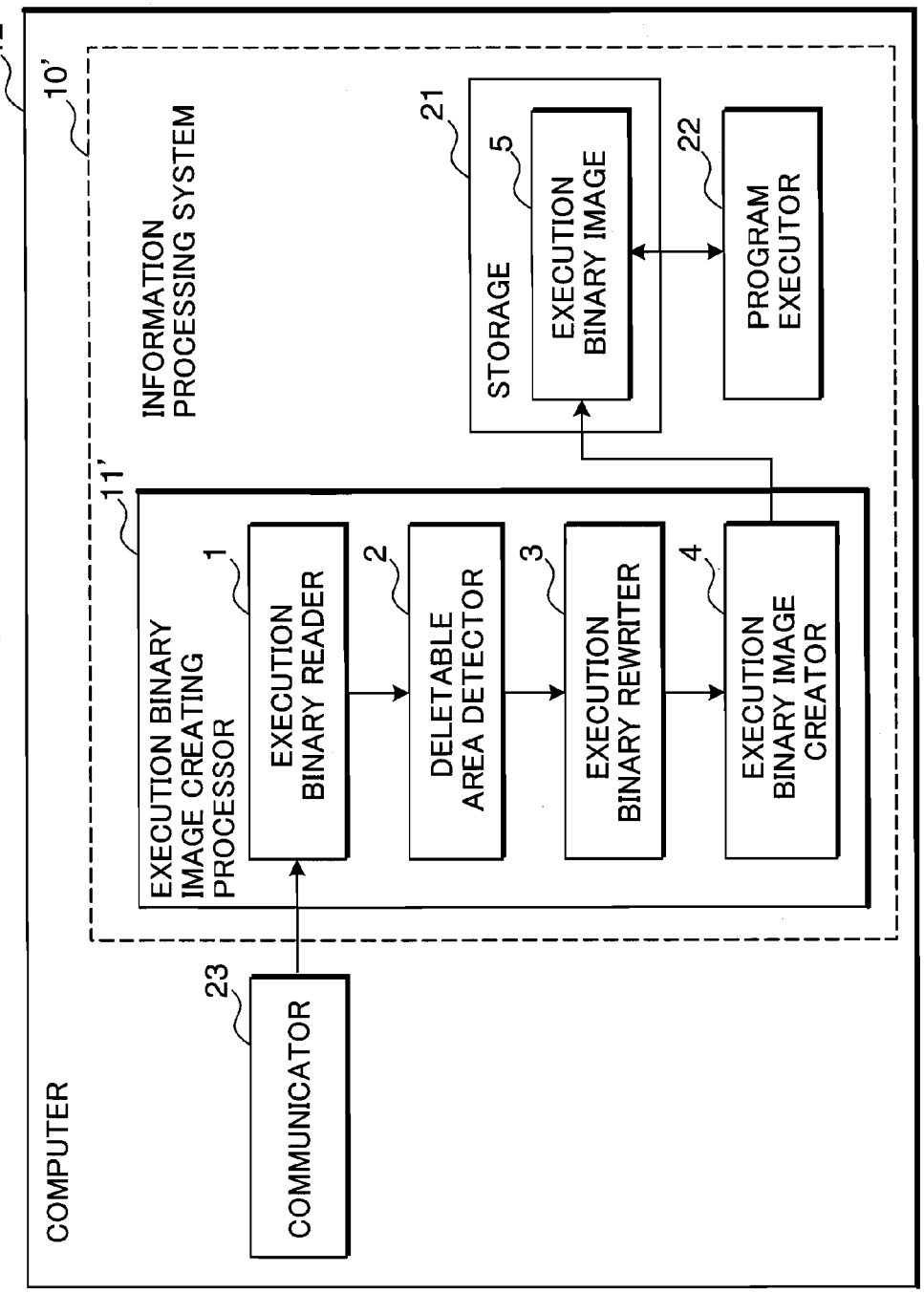
FIG. 18 is a diagram showing another configuration of the information processing system embodying the invention.

Alternatively, a function similar to the function of the execution binary image creating device may be operated on the computer on which the execution binary program is executed. FIG. 18 is a diagram showing another configuration of the information processing system in the embodiment. A computer 12' shown in FIG. 18 includes an execution binary image creating processor 11', a storage 21, a program executor 22, and a communicator 23. An information processing system 10' includes the execution binary image creating processor 11', the storage 21, and the program executor 22. The elements in the information processing system 10' shown in FIG. 18 having the same configuration as the information processing system 10 shown in FIG. 17 are indicated by the same reference numerals, and description thereof is omitted herein.

The communicator 23 receives an execution binary program via a network such as the Internet, and outputs the received execution binary program to an execution binary reader 1 in the execution binary image creating processor 11'. The execution binary image creating processor 11' and the program executor 22 is constituted of e.g. a CPU. The storage 21 is constituted of e.g. en EEPROM (Electrically Erasable Programmable Read Only Memory). The configuration of the execution binary image creating processor 11' is the same as the configuration of the execution binary image creating device shown in FIG. 1.

In this way, since the execution binary program is received via the network, and the execution binary image is created in the computer, the execution binary image can be updated.

In the embodiment, the execution binary program is received via the network to create the execution binary image. Alternatively, an execution binary image may be created by reading an execution binary program from a computer-readable recording medium such as a CD-ROM. In the modification, the computer 12' has a recording medium driver for driving a recording medium. The recording medium driver reads out the execution binary program from the recording medium, and outputs the readout execution binary program to the execution binary reader 1 in the execution binary image creating processor 11'.

The foregoing embodiment has been described by taking an example of ELF format as a representative example of the format of the execution binary program. The scope of use is not limited to the execution binary program in ELF format. With use of an execution binary program in the other format, relocation information/symbol information can also be retained in the similar manner as described above, and the operation can be executed in the similar manner as described above.

The foregoing embodiment has been described primarily based on the execution binary image creating device. The embodiment may be applied to an information processing system, an information processing method, an execution binary image creating method, an execution binary image creating program, a computer-readable recording medium recorded with the execution binary image creating program, an execution binary image executing device, an execution binary image executing method, an execution binary image executing program, and a computer-readable recording medium recorded with the execution binary image executing program.

The foregoing description is merely an example of the invention in every aspect of the invention, and does not delimit the scope of the invention. It is to be understood that various changes and modifications should be construed as being included in the invention, as far as such changes and modifications do not depart from the scope of the invention hereinafter defined.

For instance, at least one of the execution binary reader 1, the deletable area detector 2, the execution binary rewriter 3, and the execution binary image creator 4 may be incorporated in a one-chip LSI (large scale integration). Incorporating at least one of the execution binary reader 1, the deletable area detector 2, the execution binary rewriter 3, and the execution binary image creator 4 in a one-chip LSI facilitates a fabricating process of the execution binary image creating device.

The foregoing embodiment and/or the modifications primarily include the inventions having the following arrangements.

An information processing system according to an aspect of the invention comprises: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; an execution binary image converting section for reducing a data amount of the specific data included in the execution binary program rewritten by the execution binary rewriting section, and converting the execution binary program into an execution binary image in a format recognizable on the computer; an execution binary image storing section for storing the execution binary image converted by the execution binary image converting section; and an executing section for developing the execution binary image stored in the execution binary image storing section in a virtual address space for execution.

An information processing method according to another aspect of the invention comprises: an execution binary reading step of reading configuration information representing an internal configuration of an execution binary program to be executed on a computer; a deletable area detecting step of acquiring the configuration information of the execution binary program read in the execution binary reading step, analyzing information to be used in performing address resolution at the time of execution, and detecting a deletable area in the execution binary program, if the address resolution is not performed; an execution binary rewriting step of rewriting the deletable area in the execution binary program detected in the deletable area detecting step into specific data; an execution binary image converting step of reducing a data amount of the specific data included in the execution binary program rewritten in the execution binary rewriting step, and converting the execution binary program into an execution binary image in a format recognizable on the computer; an execution binary image storing step of storing the execution binary image converted in the execution binary image converting step in an execution binary image storing section; and an executing step of developing the execution binary image stored in the execution binary image storing section in the execution binary image storing step, in a virtual address space for execution.

In the above arrangements, the configuration information representing the internal configuration of the execution binary program to be executed on the computer is read. Then, the read configuration information of the execution binary program is acquired, and analysis is made on the information to be used in performing the address resolution at the time of execution. If the address resolution is not performed, the deletable area in the execution binary program is detected. Subsequently, the detected deletable area in the execution binary program is rewritten into the specific data. Then, the data amount of the rewritten specific data included in the execution binary program is reduced, and the execution binary program is converted into the execution binary image in the format recognizable on the computer. The converted execution binary image is stored in the execution binary image storing section, and the execution binary image stored in the execution binary image storing section is developed in the virtual address space for execution.

In the above arrangements, the deletable area such as relocation information or symbol information is detected from the execution binary program. The detected deletable area is rewritten into specific data, and the data amount of the specific data is reduced. This enables to reduce the data amount of the execution binary image, without changing the location address of the execution code main body such as text information or data information included in the execution binary program.

In the information processing system, preferably, the execution binary reading section may read the execution binary program, in which the address resolution on symbols have been completed.

In the above arrangement, since the execution binary program where the symbol address resolution has been completed is read, symbol information relating to symbols, and relocation information to be used in symbol resolution can be deleted.

In the information processing system, preferably, the specific data may be data having a larger compression rate than other data in the execution binary program, and the execution binary image converting section may compress the execution binary program rewritten by the execution binary rewriting section in converting the execution binary program into the execution binary image.

In the above arrangement, in converting the execution binary program into the execution binary image, the execution binary program where the deletable area is written into the specific data is compressed. This enables to increase the compression rate of the specific data in the execution binary program, as compared with the other data, thereby enabling to reduce the data amount of the execution binary image.

In the information processing system, preferably, the execution binary program may be divided in the unit of section, the deletable area may correspond to a predetermined area in the sections, and the execution binary rewriting section may collect the areas rewritten into the specific data in the unit of section of the execution binary program.

In the above arrangement, the execution binary program is divided in the unit of section, the deletable area corresponds to the predetermined area in the section, the areas rewritten into the specific data are collected in the unit of section of the execution binary program, and the execution binary program is compressed. This enables to increase the compression rate of the specific data in the execution binary program, as compared with the other data, thereby enabling to further reduce the data amount of the execution binary image.

In the information processing system, preferably, the execution binary program may be divided in the unit of section, the deletable area may correspond to the sections, and the execution binary rewriting section may collect the areas rewritten into the specific data with respect to an entirety of the execution binary program.

In the above arrangement, the execution binary program is divided in the unit of section, the deletable area corresponds to the sections, the areas rewritten into the specific data are collected with respect to the entirety of the execution binary program, and the execution binary program is compressed. This enables to increase the compression rate of the specific data in the execution binary program, as compared with the other data, thereby enabling to further reduce the data amount of the execution binary image.

In the information processing system, preferably, in converting the execution binary program into the execution binary image, the execution binary image converting section may delete the area rewritten into specific data by the execution binary rewriting section, create a shared area to be shared in the execution binary program, the shared area storing the specific data therein, and create administration information for administering a position of the deleted area in the execution binary program in association with the shared area.

In the above arrangement, in converting the execution binary program into the execution binary image, the area rewritten into specific data is deleted, the shared area which stores the specific data and which is to be shared in the execution binary program is created, and the administration information for administering the position of the deleted area in the execution binary program in association with the shared area is created. Thus, since the area rewritten into the specific data is deleted, and the specific data is stored merely in the shared area, the data amount of the specific data included in the execution binary image can be reduced, thereby enabling to reduce the data amount of the entirety of the execution binary image.

In the information processing system, preferably, in developing the execution binary image stored in the execution binary image storing section in the virtual address space, the executing section may refer to the administration information recognize the position of the deleted area in the execution binary program by referring to the administration information, and allocate the specific data stored in the shared area in the virtual address space corresponding to the recognized position.

In the above arrangement, in developing the execution binary image stored in the execution binary image storing section in the virtual address space, the administration information is referred to, the position of the deleted area in the execution binary program is recognized, and the specific data stored in the shared area is allocated to the virtual address space corresponding to the recognized position. This enables to locate the execution binary image in the virtual address space, without changing the location address of the execution code main body such as text information or data information included in the execution binary program.

In the information processing system, preferably, the execution binary reading section may read, from the execution binary program, address resolution information indicating whether the address resolution has been completed with respect to the execution binary program, and the deletable area detecting section may judge whether the address resolution information read by the execution binary reading section indicates address resolution completion, and may be inoperative to detect the deletable area from the execution binary program, if the address resolution information indicates address resolution incompletion.

In the above arrangement, the address resolution information indicating whether the address resolution has been completed with respect to the execution binary program is read from the execution binary program. Judgment is made as to whether the read address resolution information indicates address resolution completion. If the address resolution information indicates address resolution incompletion, the deletable area is not detected from the execution binary program. This enables to detect the deletable area merely when the address resolution information indicates address resolution completion, thereby enabling to detect symbol information/relocation information as the deletable area.

In the information processing system, preferably, the execution binary program may be divided in the unit of section, and the deletable area detecting section may remove, from an object to be deleted, the information to be used in performing the address resolution in the execution binary program, if the information is referred to by the other section.

In the above arrangement, even if the information is used for performing the address resolution in the execution binary program, in the case where the information is referred to by the other section, the information is removed from the object to be deleted. Thus, the information to be referred to by the other section is retained. This enables to prevent a drawback that referee data may be missing.

In the information processing system, preferably, the execution binary program may include multiples execution binary programs, and the deletable area detecting section may remove, from an object to be deleted, the information to be used in performing the address resolution in the execution binary program, if the information is referred to by the other execution binary program.

In the above arrangement, even if the information is used for performing the address resolution in the execution binary program, in the case where the information is referred to by the other execution binary program, the information is removed from the object to be deleted. Thus, the information to be referred to by the other execution binary program is retained. This enables to prevent a drawback that referee data may be missing.

In the information processing system, preferably, the deletable area detecting section may detect whether multiple symbols share a common character string in the execution binary program, and detect the area corresponding to the symbols and the character string as the deletable area, if all the symbols sharing the character string are deletable.

In the above arrangement, there is detected whether the multiple symbols share the common character string in the execution binary program. Exclusively when all the symbols sharing the character string are deletable, the area corresponding to the symbols and the character string is detected as the deletable area. In the case where multiple symbols share a certain character string in the execution binary program, even if one of the symbols is judged to be deletable, unless the other of the symbols is judged to be deletable, the character string shared by the multiple symbols, and the symbol information relating to the symbols in the execution binary program cannot be deleted. This enables to prevent a drawback that a character string may be deleted based on a judgment that one of the symbols is deletable, thereby restricting the other symbol sharing the character string from designating the character string.

An execution binary image creating device according to another aspect of the invention comprises: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; and an execution binary image converting section for reducing a data amount of the specific data included in the execution binary program rewritten by the execution binary rewriting section, and converting the execution binary program into an execution binary image in a format recognizable on the computer.

An execution binary image creating method according to another aspect of the invention comprises: an execution binary reading step of reading configuration information representing an internal configuration of an execution binary program to be executed on a computer; a deletable area detecting step of acquiring the configuration information of the execution binary program read in the execution binary reading step, analyzing information to be used in performing address resolution at the time of execution, and detecting a deletable area in the execution binary program, if the address resolution is not performed; an execution binary rewriting step of rewriting the deletable area in the execution binary program detected in the deletable area detecting step into specific data; and an execution binary image converting step of reducing a data amount of the specific data included in the execution binary program rewritten in the execution binary rewriting step, and converting the execution binary program into an execution binary image in a format recognizable on the computer.

An execution binary image creating program according to another aspect of the invention causes a computer to function as: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; and an execution binary image converting section for reducing a data amount of the specific data included in the execution binary program rewritten by the execution binary rewriting section, and converting the execution binary program into an execution binary image in a format recognizable on the computer.

A computer-readable recording medium recorded with an execution binary image creating program according to another aspect of the invention causes a computer to function as: an execution binary reading section for reading configuration information representing an internal configuration of an execution binary program to be executed on a computer; a deletable area detecting section for acquiring the configuration information of the execution binary program read by the execution binary reading section, analyzing information to be used in performing address resolution at the time of execution, and detecting a deletable area in the execution binary program, if the address resolution is not performed; an execution binary rewriting section for rewriting the deletable area in the execution binary program detected by the deletable area detecting section into specific data; and an execution binary image converting section for reducing a data amount of the specific data included in the execution binary program rewritten by the execution binary rewriting section, and converting the execution binary program into an execution binary image in a format recognizable on the computer.

In the above arrangements, the configuration information representing the internal configuration of the execution binary program to be executed on the computer is read. Then, the read configuration information of the execution binary program is acquired, and analysis is made on the information to be used in performing the address resolution at the time of execution. If the address resolution is not performed, the deletable area in the execution binary program is detected. Subsequently, the detected deletable area in the execution binary program is rewritten into the specific data. Then, the data amount of the rewritten specific data included in the execution binary program is reduced, and the execution binary program is converted into the execution binary image in the format recognizable on the computer. The converted execution binary image is stored in the execution binary image storing section, and the execution binary image stored in the execution binary image storing section is developed in the virtual address space for execution.

In the above arrangements, a deletable area such as relocation information or symbol information is detected from the execution binary program. The detected deletable area is rewritten into specific data, and the data amount of the specific data is reduced. This arrangement enables to reduce the data amount of the execution binary image, without changing the location address of the execution code main body, such as text information or data information included in the execution binary program.

An execution binary image executing device according to another aspect of the invention comprises: an execution binary image storing section for storing an execution binary image obtained by rewriting a deletable area in an execution binary program to be executed on a computer into specific data, reducing a data amount of the specific data included in the rewritten execution binary program, and performing conversion into a format recognizable on the computer; and an executing section for developing the execution binary image stored in the execution binary image storing section in a virtual address space for execution.

An execution binary image executing method according to another aspect of the invention comprises: an execution binary image storing step of storing an execution binary image in an execution binary image storing section, the execution binary image being obtained by rewriting a deletable area in an execution binary program to be executed on a computer into specific data, reducing a data amount of the specific data included in the rewritten execution binary program, and performing conversion into a format recognizable on the computer; and an executing step of developing the execution binary image stored in the execution binary image storing section in the execution binary image storing step, in a virtual address space for execution.

An execution binary image executing program according to yet another aspect of the invention causes a computer to function as: an execution binary image storing section for storing an execution binary image obtained by rewriting a deletable area in an execution binary program to be executed on a computer into specific data, reducing a data amount of the specific data included in the rewritten execution binary program, and performing conversion into a format recognizable on the computer; and an executing section for developing the execution binary image stored in the execution binary image storing section in a virtual address space for execution.

A computer-readable recording medium recorded with an execution binary image executing program according to still another aspect of the invention causes a computer to function as: an execution binary image storing section for storing an execution binary image obtained by rewriting a deletable area in an execution binary program to be executed on a computer into specific data, reducing a data amount of the specific data included in the rewritten execution binary program, and performing conversion into a format recognizable on the computer; and an executing section for developing the execution binary image stored in the execution binary image storing section in a virtual address space for execution.

In the above arrangements, the deletable area in the execution binary program to be executed on the computer is rewritten into the specific data. The data amount of the rewritten specific data included the execution binary program is reduced. The execution binary image converted in the format recognizable on the computer is stored in the execution binary image storing section. Then, the execution binary image stored in the execution binary image storing section is developed in the virtual address space for execution. This enables to store the execution binary image whose data amount has been reduced, thereby enabling to reduce a storage capacity necessary for storing the execution binary image.

Exploitation in Industry

The information processing system, the information processing method, the execution binary image creating device, the execution binary image creating method, the execution binary image creating program, the computer-readable recording medium recorded with the execution binary image creating program, the execution binary image executing device, the execution binary image executing method, the execution binary image executing program, and the computer-readable recording medium recorded with the execution binary image executing program of the invention are advantageous in reducing the data size of a program to be executed on a computer, and accordingly, industrially useful in various devices loaded with the computer, because the memory size can be reduced.

The invention claimed is:

1. An information processing system, comprising:
an execution binary reading section for reading configuration information representing an internal configuration of an execution binary program to be executed on a computer;
an area detecting section for acquiring the configuration information, which represents the internal configuration of the execution binary program, read by the execution binary reading section, and detecting a first area of areas of the execution binary program that have been used once for address resolution in an address space, the detected first area being an area which is not required to be used in running the execution binary program a next time;
an execution binary rewriting section for rewriting data existing in the detected first area into a data string of a predetermined specific pattern;
an execution binary image converting section for (i) dividing the first area including the data string, as rewritten by the execution binary rewriting section, into a plurality of unit areas, (ii) configuring the execution binary program such that each respective unit area of the plurality of unit areas of the divided first area designates a second area physically identical to the first area via the address space, and (iii) deleting the first area, as represented by the divided plurality of unit areas, from the execution binary program, so as to convert the execution binary program into an execution binary image in a format recognizable on the computer;
an execution binary image storing section including a memory for storing the execution binary image converted by the execution binary image converting section; and
an executing section for detecting the first area deleted by the execution binary image converting section, allocating an address space for the deleted first area, and setting the allocated address space such that the second area is designated via the allocated address space while developing the execution binary image stored in the execution binary image storing section in the allocated address space for execution.

2. The information processing system according to claim 1, wherein the execution binary reading section reads the execution binary program, in which the address resolution on symbols has been completed.

3. The information processing system according to claim 1, wherein the execution binary image converting section compresses the execution binary program, as rewritten by the execution binary rewriting section, when converting the execution binary program into the execution binary image.

4. The information processing system according to claim 3,
   wherein the execution binary program is divided in units of sections,
   wherein the first area corresponds to a predetermined area in the sections, and
   wherein the execution binary rewriting section collects areas rewritten into data having a larger compression rate in the units of sections of the execution binary program.

5. The information processing system according to claim 3,
   wherein the execution binary program is divided in units of sections,
   wherein the first area corresponds to the sections, and
   wherein the execution binary rewriting section collects areas rewritten into data having a larger compression rate with respect to an entirety of the execution binary program.

6. The information processing system according to claim 1, wherein, in converting the execution binary program into the execution binary image, the execution binary image converting section deletes an area rewritten into data having a larger compression rate by the execution binary rewriting section, creates a shared area to be shared in the execution binary program, the shared area storing the data having the larger compression rate, and creates administration information for administering a position of the deleted area in the execution binary program in association with the shared area.

7. The information processing system according to claim 6, wherein, in developing the execution binary image stored in the execution binary image storing section in the virtual address space, the executing section refers to the administration information, recognizes the position of the deleted area in the execution binary program by referring to the administration information, and allocates the data having the larger compression rate stored in the shared area in the virtual address space corresponding to the recognized position.

8. The information processing system according to claim 1,
   wherein the execution binary reading section reads, from the execution binary program, address resolution information indicating whether the address resolution has been completed with respect to the execution binary program, and
   wherein the area detecting section judges whether the address resolution information read by the execution binary reading section indicates address resolution completion or address resolution incompletion, and is inoperative to detect the first area from the execution binary program, when the address resolution information indicates the address resolution incompletion.

9. The information processing system according to claim 1,
   wherein the execution binary program is divided in units of sections, and
   wherein the area detecting section removes, from an object to be deleted, the information to be used in performing the address resolution in the execution binary program, when the information to be used in performing the address resolution is referred to by another section.

10. The information processing system according to claim 1,
    wherein the execution binary program includes multiple execution binary programs, and
    wherein the area detecting section removes, from an object to be deleted, the information to be used in performing the address resolution in the execution binary program, when the information to be used in performing the address resolution is referred to by another execution binary program of the multiple execution binary programs.

11. The information processing system according to claim 1, wherein the area detecting section detects whether multiple symbols share a common character string in the execution binary program, and detects an area corresponding to the symbols and the character string as the first area, when all of the symbols sharing the character string are deletable.

12. An information processing method of using an execution binary image creating device and an execution binary image executing device, the information processing method comprising:
    an execution binary reading step of reading, via the execution binary image creating device, configuration information representing an internal configuration of an execution binary program to be executed on a computer;
    an area detecting step of (i) acquiring, via the execution binary image creating device, the configuration information, which represents the internal configuration of the execution binary program, read in the execution binary reading step, and (ii) detecting, via the execution binary image creating device, a first area of areas of the execution binary program that have been used once for address resolution in an address space, the detected first area being an area which is not required to be used in running the execution binary program a next time;
    an execution binary rewriting step of rewriting, via the execution binary image creating device, data existing in the detected first area into a data string of a predetermined specific pattern;
    an execution binary image converting step of (i) dividing, via the execution binary image creating device, the first area including the data string, as rewritten in the execution binary rewriting step, into a plurality of unit areas, (ii) configuring, via the execution binary image creating device, the execution binary program such that each respective unit area of the plurality of unit areas of the divided first area designates a second area physically identical to the first area via the address space, and (iii) deleting, via the execution binary image creating device, the first area, as represented by the divided plurality of unit areas, from the execution binary program, so as to convert, via the execution binary image creating device, the execution binary program into an execution binary image in a format recognizable on the computer;
    an execution binary image storing step of storing, via the execution binary image executing device, the execution binary image converted in the execution binary image converting step in an execution binary image storing section; and
    an executing step of detecting, via the execution binary image executing device, the first area deleted in the execution binary image converting step, allocating an address space for the deleted first area, and setting the allocated address space such that the second area is designated via the allocated address space while developing the execution binary image stored in the execution binary image storing section in the execution binary image storing step, in the allocated address space for execution.

13. An execution binary image creating device, comprising:
  a processor including:
    an execution binary reading section for reading configuration information representing an internal configuration of an execution binary program to be executed on a computer;
    an area detecting section for acquiring the configuration information, which represents the internal configuration of the execution binary program, read by the execution binary reading section, and detecting a first area of areas of the execution binary program that have been used once for address resolution in an address space, the dedicated first area being an area which is not required to be used in running the execution binary program a next time;
    an execution binary rewriting section for rewriting data existing in the detected first area into a data string of a predetermined specific pattern; and
    an execution binary image converting section for (i) dividing the first area including the data string, as rewritten by the execution binary rewriting section, into a plurality of unit areas, (ii) configuring the execution binary program such that each respective unit area of the plurality of unit areas of the divided first area designates a second area physically identical to the first area via the address space, and (iii) deleting the first area, as represented by the divided plurality of unit areas, from the execution binary program, so as to convert the execution binary program into an execution binary image in a format recognizable on the computer.

14. An execution binary image creating method of using an execution binary image creating device, the execution binary image creating method comprising:
  an execution binary reading step of reading, via the execution binary image creating device, configuration information representing an internal configuration of an execution binary program to be executed on a computer;
  an area detecting step of (i) acquiring, via the execution binary image creating device, the configuration information, which represents the internal configuration of the execution binary program, read in the execution binary reading step, and (ii) detecting, via the execution binary image creating device, a first area of areas of the execution binary program that have been used once for address resolution in an address space, the dedicated first area being an area which is not required to be used in running the execution binary program a next time;
  an execution binary rewriting step of rewriting, via the execution binary image creating device, data existing in the detected first area into a data string of a predetermined specific pattern; and
  an execution binary image converting step of (i) dividing, via the execution binary image creating device, the first area including the data string, as rewritten in the execution binary rewriting step, into a plurality of unit areas, (ii) configuring the execution binary program such that each respective unit area of the plurality of unit areas of the divided first area designates a second area physically identical to the first area via the address space, and (iii) deleting the first area, as represented by the divided plurality of unit areas, from the execution binary program, so as to convert, via the execution binary image creating device, the execution binary program into an execution binary image in a format recognizable on the computer.

15. A non-transitory computer-readable recording medium having an execution binary image creating program recorded thereon, the execution binary image creating program causing a computer to function as:
  an execution binary reading section for reading configuration information representing an internal configuration of an execution binary program to be executed on a computer;
  an area detecting section for acquiring the configuration information, which represents the internal configuration of the execution binary program, read by the execution binary reading section, and detecting a first area of areas of the execution binary program that have been used once for address resolution in an address space, the dedicated first area being an area which is not required to be used in running the execution binary program a next time;
  an execution binary rewriting section for rewriting data existing in the detected first area into a data string of a predetermined specific pattern; and
  an execution binary image converting section for (i) dividing the first area including the data string, as rewritten by the execution binary rewriting section, into a plurality of unit areas, (ii) configuring the execution binary program such that each respective unit area of the plurality of unit areas of the divided first area designates a second area physically identical to the first area via the address space, and (iii) deleting the first area, as represented by the divided plurality of unit areas, from the execution binary program, so as to convert the execution binary program into an execution binary image in a format recognizable on the computer.

16. An execution binary image executing device, comprising:
  an execution binary image storing section including a memory for storing an execution binary image obtained by (i) rewriting data existing in a first area of areas of an execution binary program that have been used once for address resolution in an address space, the dedicated first area being an area which is not required to be used in running the execution binary program a next time, into a data string of a predetermined specific pattern, (ii) dividing the first area including the data string, as rewritten by the rewriting of the data, into a plurality of unit areas, (iii) configuring the execution binary program, such that each respective unit area of the plurality of unit areas of the divided first area designates a second area physically identical to the first area via the address space, and (iv) deleting the first area, as represented by the divided plurality of unit areas, from the execution binary program, so as to convert the execution binary program into the execution binary image in a format recognizable on a computer; and
  an executing section for detecting the first area deleted by the deleting of the first area, allocating an address space for the deleted first area, and setting the allocated address space such that the second area is designated via the allocated address space while developing the execution binary image stored in the execution binary image storing section in the allocated address space for execution.

17. An execution binary image executing method of using an execution binary image executing device, the execution binary image executing method comprising:

an execution binary image storing step of storing, via the execution binary image executing device, an execution binary image in an execution binary image storing section, the execution binary image being obtained by (i) rewriting data existing in a first area of areas of an execution binary program to be executed on a computer that have been used once for address resolution in an address space, the dedicated first area being an area which is not required to be used in running the execution binary program a next time, into a data string of a predetermined specific pattern, (ii) dividing via the execution binary image executing device, the first area including the data string, as rewritten by the rewriting of the data, into a plurality of unit areas (iii) configuring the execution binary program, such that each respective unit area of the plurality of unit areas of the divided first area designates a second area physically identical to the first area via the address space, and (iv) deleting the first area, as represented by the divided plurality of unit areas, from the execution binary program, so as to convert, via the execution binary image executing device, the execution binary program into the execution binary image in a format recognizable on the computer; and an executing step of detecting the first area deleted by in the deleting of the first area, allocating an address space for the deleted first area, and setting the allocated address space such that the second area is designated via the allocated address space while developing, via the execution binary image executing device, the execution binary image stored in the execution binary image storing section in the execution binary image storing step, in the allocated address space for execution.

18. A non-transitory computer-readable recording medium having an execution binary image executing program recorded thereon, the execution binary image executing program causing a computer to function as:

an execution binary image storing section for storing an execution binary image obtained by (i) rewriting data existing in a first area of areas of an execution binary program to be executed on the computer that have been used once for address resolution in an address space, the dedicated first area being an area which is not required to be used in running the execution binary program a next time, into data string of a predetermined specific pattern, (ii) dividing the first area including the data string, as rewritten by the rewriting of the data, into a plurality of unit areas, (iii) configuring the execution binary program, such that each respective unit area of the plurality of unit areas of the divided first area designates a second area physically identical to the first area via the address space, and (iv) deleting the first area, as represented by the divided plurality of unit areas, from the execution binary program, so as to convert the execution binary program into the execution binary image in a format recognizable on the computer; and an executing section for detecting the first area deleted in the deleting of the first area, allocating an address space for the deleted first area, and setting the allocated address space such that the second area is designated via the allocated address space while developing the execution binary image stored in the execution binary image storing section in the allocated address space for execution.

* * * * *